(12) United States Patent
Voigt et al.

(10) Patent No.: US 8,667,009 B2
(45) Date of Patent: Mar. 4, 2014

(54) SYSTEMS AND METHODS FOR UTILIZING AND SEARCHING SOCIAL NETWORK INFORMATION

(75) Inventors: Matthew Voigt, San Diego, CA (US); Michael Petanovitch, San Diego, CA (US)

(73) Assignee: Saambaa LLC, San Diego, CA (US)

( * ) Notice: Subject to any disclaimer, the term of this patent is extended or adjusted under 35 U.S.C. 154(b) by 0 days.

(21) Appl. No.: 13/355,463

(22) Filed: Jan. 20, 2012

(65) Prior Publication Data

US 2012/0185486 A1 Jul. 19, 2012

Related U.S. Application Data

(63) Continuation-in-part of application No. PCT/US2010/042580, filed on Jul. 20, 2010.

(60) Provisional application No. 61/227,376, filed on Jul. 21, 2009, provisional application No. 61/348,213, filed on May 25, 2010, provisional application No. 61/452,061, filed on Mar. 11, 2011.

(51) Int. Cl.
*G06F 17/30* (2006.01)

(52) U.S. Cl.
USPC ..... 707/769; 707/798; 705/14.66; 705/14.53; 709/204; 715/753

(58) Field of Classification Search
USPC .......... 707/740, 798, E17.083, E17.089, 722, 707/709, 769, 765, 749, 723, 776, E17.014, 707/E17.074, E17.108; 705/14.66, 14.53, 705/26.62; 715/753; 709/204
See application file for complete search history.

(56) References Cited

U.S. PATENT DOCUMENTS 5,062,074 A * 10/1991 Kleinberger .......... 707/E17.039
7,155,435 B1 * 12/2006 Day et al. ....................... 715/751
(Continued)

FOREIGN PATENT DOCUMENTS

WO    WO 2004/104853 A1    12/2004
WO    WO 2007/100200 A1    9/2007

OTHER PUBLICATIONS

Kate Ehrlich, Ching-Yung Lin, and Vicky Griffiths-Fisher—"Searching for experts in the enterprise: combining text and social network analysis"—Proceeding Group '07 Proceedings of the 2007 international ACM conference on Supporting group work pp. 117-126.*

(Continued)

*Primary Examiner* — Jean B Fleurantin
*Assistant Examiner* — Anh Ly
(74) *Attorney, Agent, or Firm* — Wilson Sonsini Goodrich & Rosati

(57) ABSTRACT

Methods and systems for indexing, storing, recalling and displaying social network user profiles, event calendar postings and user feed postings are described. A single, discrete set of keywords, can be utilized and assigned to both user profiles and postings and can operate as a method of indexing. The assignment of these keywords may allow users to control the display of calendar and feed content by matching assigned posting keywords to assigned profile keywords via a matching algorithm. Matched event-related postings may also be automatically displayed in a user's calendar. Searches of profiles and postings may also be performed by constructing queries using the same set of discrete keywords attached to profiles and postings. Users may have the ability to control the display of specific profile information and postings via privacy settings, which utilize unique methods of tracking relationship segmentation and social distance.

16 Claims, 27 Drawing Sheets

(56) References Cited

U.S. PATENT DOCUMENTS

| | | |
|---|---|---|
| 8,024,317 B2 * | 9/2011 | Nair et al. .................... 707/709 |
| 2007/0162547 A1 * | 7/2007 | Ross ........................... 709/204 |
| 2007/0233736 A1 * | 10/2007 | Xiong et al. ............... 707/104.1 |
| 2008/0147487 A1 * | 6/2008 | Hirshberg ..................... 705/10 |
| 2008/0215428 A1 * | 9/2008 | Ramer et al. ................. 705/14 |
| 2008/0306826 A1 * | 12/2008 | Kramer et al. ................ 705/14 |
| 2009/0043739 A1 | 2/2009 | Choi |
| 2009/0216569 A1 * | 8/2009 | Bonev et al. ................... 707/3 |
| 2010/0017371 A1 * | 1/2010 | Whalin et al. .................. 707/3 |
| 2010/0179874 A1 * | 7/2010 | Higgins et al. ............. 705/14.53 |
| 2010/0274815 A1 * | 10/2010 | Vanasco ........................ 707/798 |
| 2011/0213762 A1 * | 9/2011 | Sherrets et al. ............... 707/706 |
| 2011/0219073 A1 * | 9/2011 | Lawler et al. ................. 709/204 |

OTHER PUBLICATIONS

Shelly D. Farnham, Peter T. Brown, and Jordan L.K. Schwartz—"Leveraging social software for social networking and community development at events" —Proceeding C&T '09 Proceedings of the fourth international conference on Communities and technologies. ACM Jun. 25-27, 2009, pp. 235-244.*

International search report and written opinion dated Feb. 9, 2011 for PCT/US2010/042580.

* cited by examiner

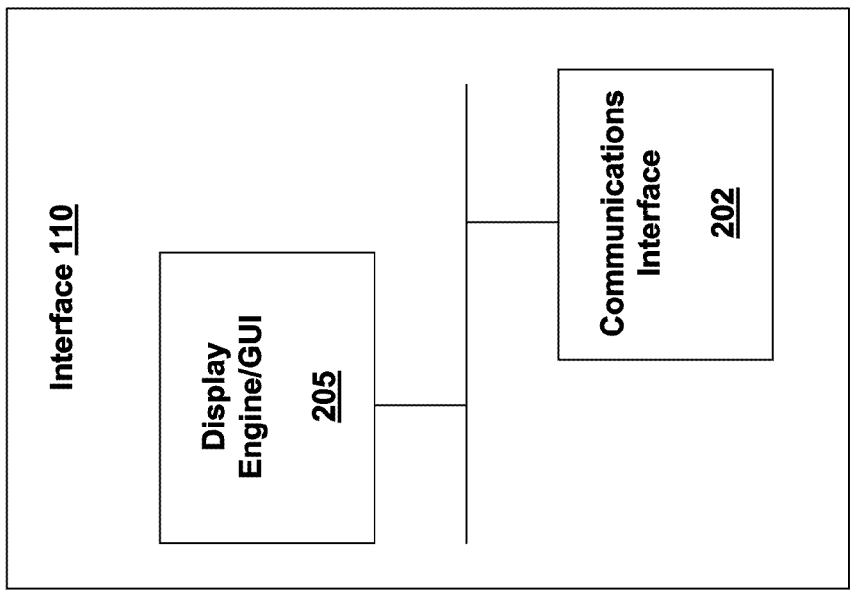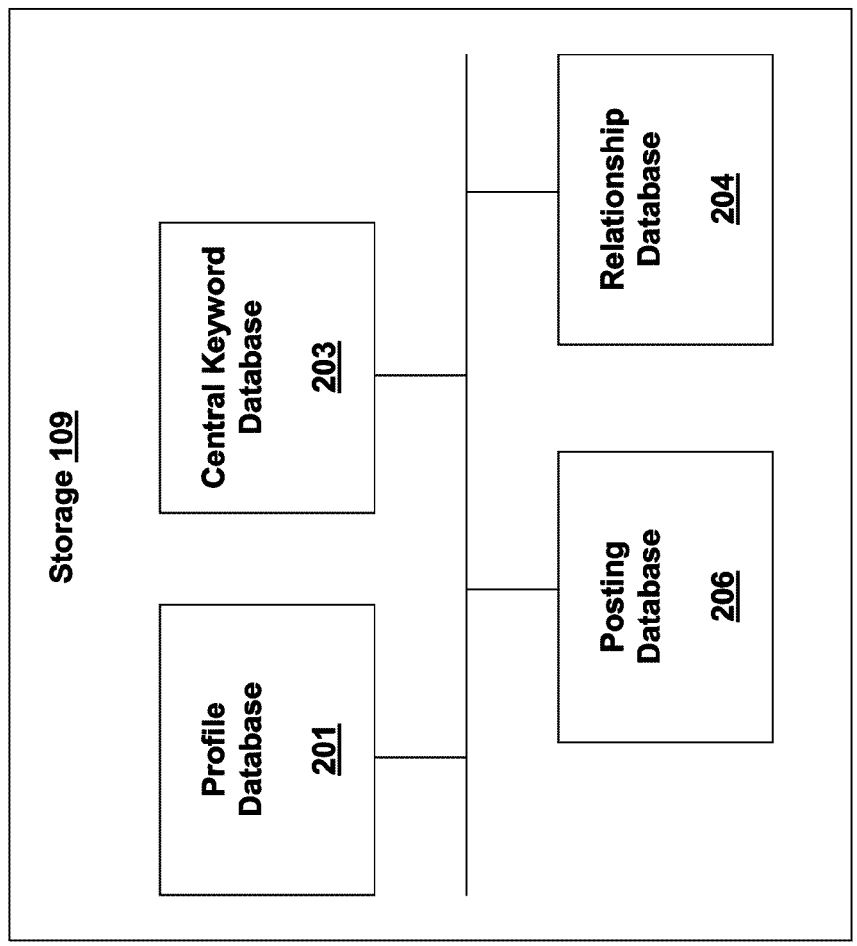
FIG. 2

Manage Keywords

*You have 54 Keywords View All*

WHO I AM: *15 keywords*

THINGS I LIKE: *3 keywords*

Hide Privacy & Availability Settings

| | Hide from business | Connection of — 1903 | Available for this? | Delete: |
|---|---|---|---|---|
| | | | Sort by [Recently Added ▼] | |
| Euchre — 1901 | ☐ | ○ 1* ○ 2* ● All | ☑ | 🗑 |
| Painting | ☑ — 1904 | ○ 1* ● 2* ○ All | ☑ | 🗑 |
| Astronomy | ☑ | ○ 1* ● 2* ○ All | ☑ — 1902 | 🗑 |

SPORTS & ATHLETICS: *15 keywords*

HELPING OTHERS: *12 keywords*

1900

FIG. 19 saambaa
Do it with Friends

Home  SmartCalendar  Friends  Interests  Settings  Help    User Name  Sign Out

▲ 0 Notifications
♦ 12 Posts Created
▲ 4 Friend Requests

Photo

May 2010

| S | M | T | W | T | F | S |
|---|---|---|---|---|---|---|
| 25 | 26 | 27 | 28 | 29 | 30 | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 | 1 | 2 | 3 | 4 | 5 |

2001

Map
2005

Filters 2009

Entertainment
Music, Movies, Social, Games

Sports & Athletics
Individual & Team, Outdoors, Extreme

Recreation
Hobbies, Arts & Crafts, Pastimes

Arts & Culture
Fine Arts, Science, Business, Health

Lifestyle
Relationships, Parenting, Backgrounds

2006  Friends' Activities (4)    Suggested Activities (51)  2008

Jeff Battson (2° from you) posted
"Beach babies & beers (hidden of c
Today 6/17 @ 12:00p

Matt Voigt (1° from you) posted
"Reggae and beer fest at Del Mar ra
Today 6/17 @ 4:30p    2007

Saambaa suggested and 3 friends joined
"Poker night @ Barona Casino"
Today 6/17 @ 8:00p
                                    2011

Jerry Emilo (>3°) posted and 6 friends joined
"Brazil vs. Ivory Coast – World Cup"
Today 6/17 @ 11:00a
                         2010

Advanced Options 2004

Sort 2015
Time/Date
Location
Friends Attending
Things I'm attending

2003

FIG. 20 saambaa
Do it with friends

0 Notifications
12 Posts Created
4 Friend Requests

Photo

Home  SmartCalendar  Friends  Interests  Settings  Help       User Name  Sign Out

My Account

| | | |
|---|---|---|
| My Posts | 17 | (2205) |
| My Activities | 11 | (2206) |
| Friend Requests | 7 | (2207) |
| Friend Suggestions | 0 | (2208) |

The Latest

| New Activities Posted 4 (2201) | New Messages Posted 3 (2202) | Friends Who Joined Activities 8 (2203) | New Comments on Postings 2 (2204) |
|---|---|---|---| today  Fri  Sat  Sun  Mon  Tue  Wed
17  18  19  20  21  22  23

2211

Friends'  Suggested       POST
Activities  Activities     a fun activity!

2210

Jeff Battison (2nd from you) posted
"Beach babies & beers (hidden of course)"
Today 6/17 @ 12:00p

Matt Voeltl (1st from you) posted
"Reggae and beer fest at Del Mar race track"
Today 6/17 @ 4:30p Saambaa suggested and 3 friends joined
"Poker night @ Barona Casino"
Today 6/17 @ 8:00p

Jerry Emilio (>3rd) posted and 6 friends joined
"Brazil vs. Ivory Coast — World Cup"
Today 6/17 @ 11:00a See more on the SmartCalendar Change your location and settings Map
2209

FIG. 22

SYSTEMS AND METHODS FOR UTILIZING AND SEARCHING SOCIAL NETWORK INFORMATION

CROSS-REFERENCE

This application is a continuation-in-part application of PCT Application No. PCT/US2010/042580 filed Jul. 20, 2010, which claims the benefit of U.S. Provisional Application No. 61/227,376 filed Jul. 21, 2009 and Provisional Application No. 61/348,213 filed May 25, 2010; this application also claims the benefit of U.S. Provisional Application No. 61/452,061 filed Mar. 11, 2011, all of which are incorporated herein by reference in their entirety.

BACKGROUND

Conventionally, users of social networking websites connect with other users by posting information about themselves to the network for access by other users. For example, a user may post interests, events, needs, requests, status updates, contact information, and so forth. Users may contact each other and/or review information about each other through a mutually-accepted bidirectional social connection, or in some cases a unidirectional connection based on privacy settings configured by a user.

Large social networking websites have developed systems for tailoring connections between various users, including event calendars, posting feeds, (a.k.a. "news feeds") and search functionality. However, in many cases it is difficult for users who do not share a direct relationship with one another to connect or view accurate information and postings concerning mutual interests or needs. This is primarily related to the way social networks allow users to store and access user profile and posting data. There is a need for improved systems and methods of indexing, storing, recalling and displaying data relating to user profiles and postings, and improved systems and methods to allow users to easily and accurately search or receive information concerning mutual interests or needs.

SUMMARY

The invention provides systems and methods for utilizing and searching social network information. Various aspects of the invention described herein may be applied to any of the particular applications set forth below. The invention may be applied as a standalone system or as a component of an integrated software solution searching information or as a component of a social networking site. The invention can be optionally integrated into existing business and social networking processes seamlessly. It shall be understood that different aspects of the invention can be appreciated individually, collectively or in combination with each other.

In one embodiment of the invention, a method of displaying social network information is provided. The method includes steps of creating a central keyword database having a plurality of pre-defined keywords organized into categories and tagging a user profile of a user with at least one keyword from the central keyword database for associating users with keyword descriptors. In addition, the method includes tagging at least one posting with at least one keyword from the central keyword database for associating the posting with keyword descriptors and applying an automatic matching algorithm to find postings that match the user profile and allow those postings to display in an event calendar, news feed or in search results. The matching algorithm may match keywords associated with the posting and keywords associated with the user and whether the posting is displayed in a user's event calendar, news feed or within search results may depend on privacy settings for a particular user's profile.

In one embodiment, a method of displaying social network information customized to interests of a user comprises creating a central keyword database having a plurality of pre-defined keywords organized into categories; tagging a user profile of the user with at least one keyword from the central keyword database for associating users with profile keyword descriptors; tagging an posting within a social network with at least one keyword from the central keyword database for associating postings with posting keyword descriptors; applying a plurality of matching criteria to the user profile and the posting, wherein the plurality of matching criteria comprises privacy settings of user profiles and privacy settings of postings; and displaying to an event calendar or news feed of the user the posting if matched by the plurality of matching criteria to the user profile of the user, wherein the matching criteria provides the user with postings customized to interests of the user.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description below. In addition, embodiments of the present invention are not described with reference to any particular processor, programming language, machine code, etc. It will be appreciated that a variety of programming languages, machine codes, etc. may be used to implement the teachings of the invention as described herein.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 is a block diagram of the storage and interface modules of an exemplary social network provider.

FIG. 19 illustrates an exemplary configuration 1900 of privacy settings which can be applied to both user profiles and postings.

FIG. 20 illustrates an exemplary screen shot 2000 of the smart-calendar.

FIG. 22 illustrates an exemplary screen shot of a dashboard.

DETAILED DESCRIPTION

Figure 1:
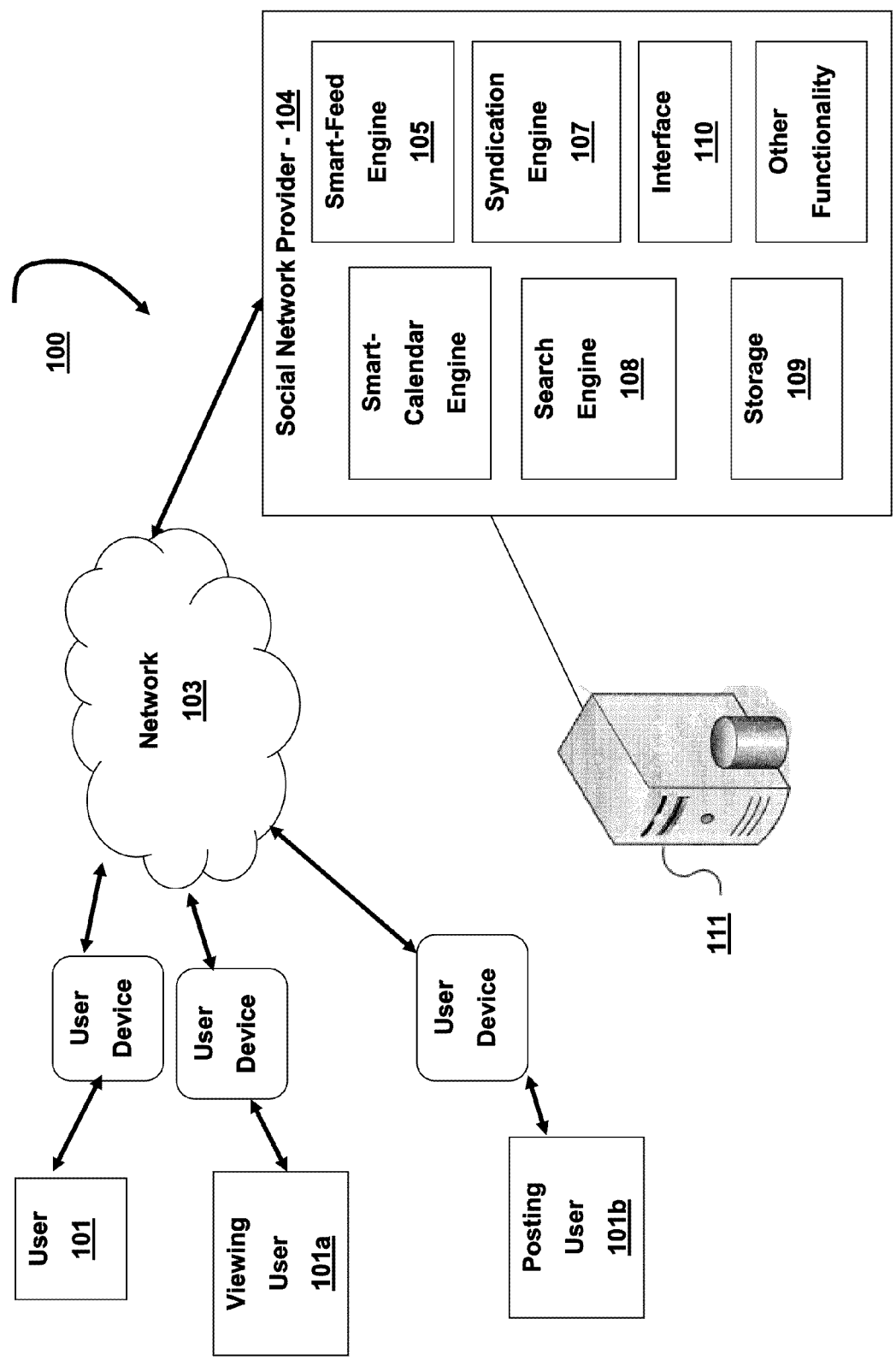
FIG. 1 illustrates an exemplary environment 100 for generating a news feed, event calendar, syndication feed, and search engine in a social network environment.

In the following detailed description, numerous specific details are set forth in order to provide a thorough understanding of the invention. However it will be understood by those of ordinary skill in the art that the invention may be practiced without these specific details. In other instances, well-known methods, procedures, components and circuits have not been described in detail so as not to obscure the invention. Various modifications to the described embodiments will be apparent to those with skill in the art, and the general principles defined herein may be applied to other embodiments. The invention is not intended to be limited to the particular embodiments shown and described.

The present invention relates generally to the indexing, storage, recall and presentation of information in a social network, and more particularly to systems and methods for indexing, storage and presentation of user profiles, postings, and scheduled events. As described herein, a posting may be related to an event, general message, jobs, service providers, dates, support groups, student needs, etc., and may contain any type of content, as desired by the user or maintained by the system. A posting may be created by a user, or imported by the system from outside the system (a.k.a. "system generated" posts.) System generated posts may be generated from information obtained from third party sources or other social networks. For example, system generated posts may be generated from information from a website which sells event tickets, a website which hosts sporting events, or a group buying website.

A system and method for indexing, storing, recalling and displaying social network user profiles and postings is provided. A social network can have a central keyword database, which organizes a finite set of keywords into various categories, which are then used to index user profiles and postings, some of which can be event postings. Postings may also be message postings, job postings, request postings, question postings, statement postings, news postings, etc. These categories may have unique classifications which affect calendar matching, feed matching, and search algorithms. A user of a social network, here referred to as the "viewing user," can describe themselves in multiple ways through the selection of specific keywords which come from the central keyword database. Such keywords are referred to herein as "profile keyword tags." A viewing user may select such profile keyword tags from a keyword database which describes himself/herself upon first signing up for an account, or at any time while using the system. Users, here referred to as "posting users," may also post items into the social network (e.g., event postings, job postings, request postings, question postings, statement postings, news postings, etc). These postings which are submitted by posting users, or are system generated, can be tagged by selecting keywords from the same central keyword database. These tags are referred to herein as "posting keyword tags."

Viewing users can configure a smart-calendar engine so their calendar may be automatically populated with event-related postings using a matching algorithm that, among other things, takes into account event-related posting keyword tags which match the viewing user's profile keyword tags. Viewing users can also configure a smart-feed engine so their news feed automatically populates with postings using a matching algorithm that, among other things, takes into account posting keyword tags which match the profile keyword tags of the viewing user. 'Posting users can also configure a syndication engine which will push the user's posting into other distribution channels such as email, text message, Facebook, Twitter, and various instant message clients. Viewing users can perform accurate searches of postings and profiles by constructing search queries in a search engine using keywords from the central keyword database. Users can maintain privacy by segmenting their relationships and controlling the viewing of posts and profile information by both relationship segmentation and social distance. Users beyond one-degree from each other can see the path of relationship by viewing a relationship map. In addition, privacy settings may be based on certain characteristics or profile keyword tags of a user. Thus, a user may control and maintain privacy by limiting their postings or certain aspects of their profiles to be viewable only by users that match certain characteristics or keyword tags. These functions are all described in more detail below.

FIG. 1 illustrates an exemplary environment 100 for generating a news feed, calendar, syndication feed, and search engine in a social network environment. One or more users, such as users 101 at user devices 102, are coupled to a social network provider 104 via a network 103. The social network provider 104 may comprise any user or entity that provides social networking services, dating services, company intranets, and so forth. For example, the social network provider 104 may host a website, or an application which resides on a website, that allows one or more users 101, at one or more user devices 102, to communicate with one another via the website and/or application. The social networking website/application offers users 101 an opportunity to connect with one or more other users 101 that share similar interests, can provide services, can provide jobs, can provide data, etc. In some embodiments a social network environment may include a segmented community. A segmented community according to one embodiment is a separate, exclusive or semi-exclusive web-based social network wherein each authenticated segmented community member accesses or interacts with other members of their respective segmented community.

Any user 101 in the social network may use the news feed, calendar and search functionality of the social network and become the viewing user 101a or become the posting user 101b as the poster of items within the social network. In some embodiments, the viewing user 101a and the posting user 101b may be the same users, for example, for purposes of reviewing a personal posting.

The social network provider 104 may include functions and capabilities such as a smart-calendar engine 106, smart-feed engine 105, search engine 108, syndication engine 107, storage 109 module, interface 110 module, each further described below, or other functionality. The social network information system (or social network provider) 104 may be coupled to a server and database 111 which can store the social network information and run the various engines.

As shown in FIG. 1, a smart-feed engine 105 is coupled to the social network provider 104. The smart-feed engine 105 utilizes profile keyword tags selected for a particular user (e.g., the viewing user 101a) to control the items displayed within the news feed (or "smart-feed") of a user such as the viewing user 101a using an algorithmic matching system that, among other things, evaluates different classifications of keywords within postings. Examples of a viewing user 101a may include a user, an association of users, members of an event, students in a class, members of a club and the like. According to some embodiments, the viewing user 101a may be coupled directly via the user device 102 to the smart-feed engine 105. According to other embodiments, the smart-feed engine 105 comprises a module associated with the social network provider 104.

A smart-calendar engine 106 is coupled to the soial network provider 104. The smart-calendar engine 106 utilizes profile keyword tags selected for a particular user (e.g., the viewing user 101a) to control event-related items displayed within the calendar of a user such as the viewing user 101a using an algorithmic matching system that, among other things, evaluates different classifications of keywords within event postings. According to some embodiments, the viewing user 101a may be coupled directly via the user device 102 to the smart-calendar engine 106. According to other embodiments, the smart-calendar engine 106 comprises a module associated with the social network provider 104.

A syndication engine 107 is coupled to the social network provider 104. The syndication engine 107 pushes postings for a particular user (e.g., the posting user 101b) into distribution channels such as email and text message, as well as social network accounts belonging to posting user 101b such as Facebook, Twitter, or various instant message clients. Examples of a posting user 101b may include a user, an association of users, members of an event, students in a class, members of a club and the like. According to some embodiments, the posting user 101b may be coupled directly via the user device 102 to the syndication engine 107. According to other embodiments, the syndication engine 107 comprises a module associated with the social network provider 104.

A search engine 108 is coupled to the social network provider 104. The search engine 108 utilizes keywords selected from the central keyword database 203 by a particular user (e.g., the viewing user 101a) to form a search query to search for users' 101 profiles, posting users' 101b postings and system generated postings using an algorithmic matching system that, among other things, evaluates different classifications of keywords within profiles and postings. According to some embodiments, the viewing user 101a may be coupled directly via the user device 102 to the search engine 108. According to other embodiments, the search engine 108 comprises a module associated with the social network provider 104.

Referring now to FIG. 2, a block diagram of storage 109 and interface 110 modules of an exemplary social network provider, such as the social network provider 104 shown in FIG. 1, is shown. Storage 109 may include a profile database 201 for storing data associated with each of the users, such as the user 101 associated with user device 102. When a user 101 subscribes to services provided by the social network provider 104, a user profile may be generated for user 101. For example, the user 101 may select descriptive keywords to be the user's profile keywords from the central keyword database 203, privacy settings, provide links to social networks they belong to, provide work information, provide contact information, or group other users 101 according to one or more categories. When the user 101 adds additional information to the user's profile, such as adding additional contacts, the user's profile in the profile database 201 may be updated with the information added. The user's profile may be stored, modified, added, and so forth to any storage medium. Fewer or more components may comprise the social network provider 104 or components of storage 109 and interface 110 and still fall within the scope of the various embodiments.

According to some embodiments, certain components of the user's profile may be created outside of the social network environment and provided to or accessed by the social network provider 104. Alternatively, the profile database 201 may be located remotely and accessed by the social network provider 104.

The social network provider 104 may also include an interface 110 which may have a display engine/GUI 205 and a communications interface 202 for communicating with users 101, such as via the user device 102 described herein, over the network 103. The user device 102 communicates various types of information, such as keyword selections, privacy setting selections, groupings of other users 101, and so forth, to the interface 110 via the communications interface 202. Any type of communications interface 202 is within the scope of various embodiments.

A central keyword database 203 provides users 101a method of tagging profiles and postings, including event postings, with an identical, finite set of keywords, which are organized into categories. For example, the keyword "painter" can be associated with a service provider, an artist or a job posting depending on the context of the user's actions. By organizing the same keyword under different categories within the central keyword database 203, users 101 can accurately tag their profiles and postings to ensure relevant searching or viewing by viewing users 101a. It should also be noted that system generated postings can be similarly tagged with keywords from the central keyword database 203 to ensure relevant searching or viewing by viewing users 101a. Furthermore, different categories may have different classifications which affect matching algorithms used by the smart-calendar engine 106, smart-feed engine 105 and search engine 108.

A viewing user 101a may select a series of profile keywords for their profile which describe activity interests, and a posting user 101b may subsequently select a series of posting keywords to describe an activity, some of which may match the viewing user's 101a profile keywords. For example, a viewing user 101a may select the keyword "Triathlete" which describes his or her activity interests. The viewing user 101a will therefore have "Triathlete" stored as one of his profile keywords. A different posting user may subsequently post or schedule an event for a triathlon practice, for example, giving a specific date and time for the event and attaching the keyword "Triathlete" to the posting. Because the viewing user's profile keyword matches the 'posting keywords, the viewing user may see the event posting via the smart-calendar engine or smart-feed engine. A viewing user may also see the event via the search engine'. The posting user may be able to set certain privacy settings such that even if some keywords selected for the posting by the posting user 101b from the central keyword database 203 are identical and stored under identical categories, a viewing user 101a may not be able to view the posting because the matching algorithm recognized the posting was not appropriate. For example, the posting user may limit the event to be viewable or searchable by users who are designated as his friends, or within a certain location, or a certain social distance, or by assigning certain posting keywords which in turn exclude a viewing user, even though one of the posting keywords may match the viewing user's profile keywords, etc.

A relationship database 204 may be provided for storing relationship data about each user 101. In various embodiments, the viewing user 101a can specify relationships with one or more users 101 of the social network via the user profile, or by any other means. The viewing user 101a can segment relationships by assigning categories, groups, lists, networks, and so forth to one or more users 101 with which the viewing user 101a has a relationship. The relationship, for example, may specify that the user 101 is a business relationship, family relationship, and so forth. Any type of relationship may be specified. The relationship database 204 may also provide a means for a viewing user 101a to track a path of social connections between the viewing user 101a and other users 101 which have a relationship distance greater than one-degree from the viewing user 101a.

A display engine/GUI 205 may also be provided by the interface 110. The display engine/GUI 205 displays one or more items posting information, profile information, and so forth to users 101. Users 101 can interact with the social network provider 104 via the display engine/GUI 205. For example, users 101 can select keywords from the central keyword database 203, select privacy settings, access their own user profile, access other users' 101 information available via the social network provider 104, and so forth, via the display engine/GUI 205. The smart-calendar, smart-feed and search engine results may be displayed in fields within the display engine/GUI 205.

A posting database 206 is provided for storing data associated with a posting user's 101b postings, and system generated postings, into storage 109, and linking such data to the posting user's 101b profile in the profile database 201. When a posting user 101b elects to publish an item with posting keyword tags for viewing by viewing users 101a in the calendar or news feed of the social network provider 104, a posting may be generated and stored in the posting database 206. For example, the posting user 101b may post an event, job posting, question, request for service provider, request for a date, and so forth, select descriptive keywords to tag the posting from the central keyword database 203, provide additional relevant information concerning the posting, select privacy settings including limits on social distance and relationship segmentation, and provide contact information for at least one other viewing user 101a to see. When the posting user 101b adds information to or modifies information in the posting, such as location information, the posting database 206 may be updated with the information added. Postings may be stored, modified, added, and so forth to any storage medium.

Although the social network provider 104 is described as being comprised of various components including a smart-calendar engine 106, a search engine 108, smart-feed engine 105, syndication engine 107, and storage 109 and interface 110 components (which may include a profile database 201, a communications interface 202, a central keyword database 203, a relationship database 204, a display engine/GUI 205, and a posting database 206), fewer or more components may comprise the social network provider 104 and still fall within the scope of various embodiments.

Figure 3:
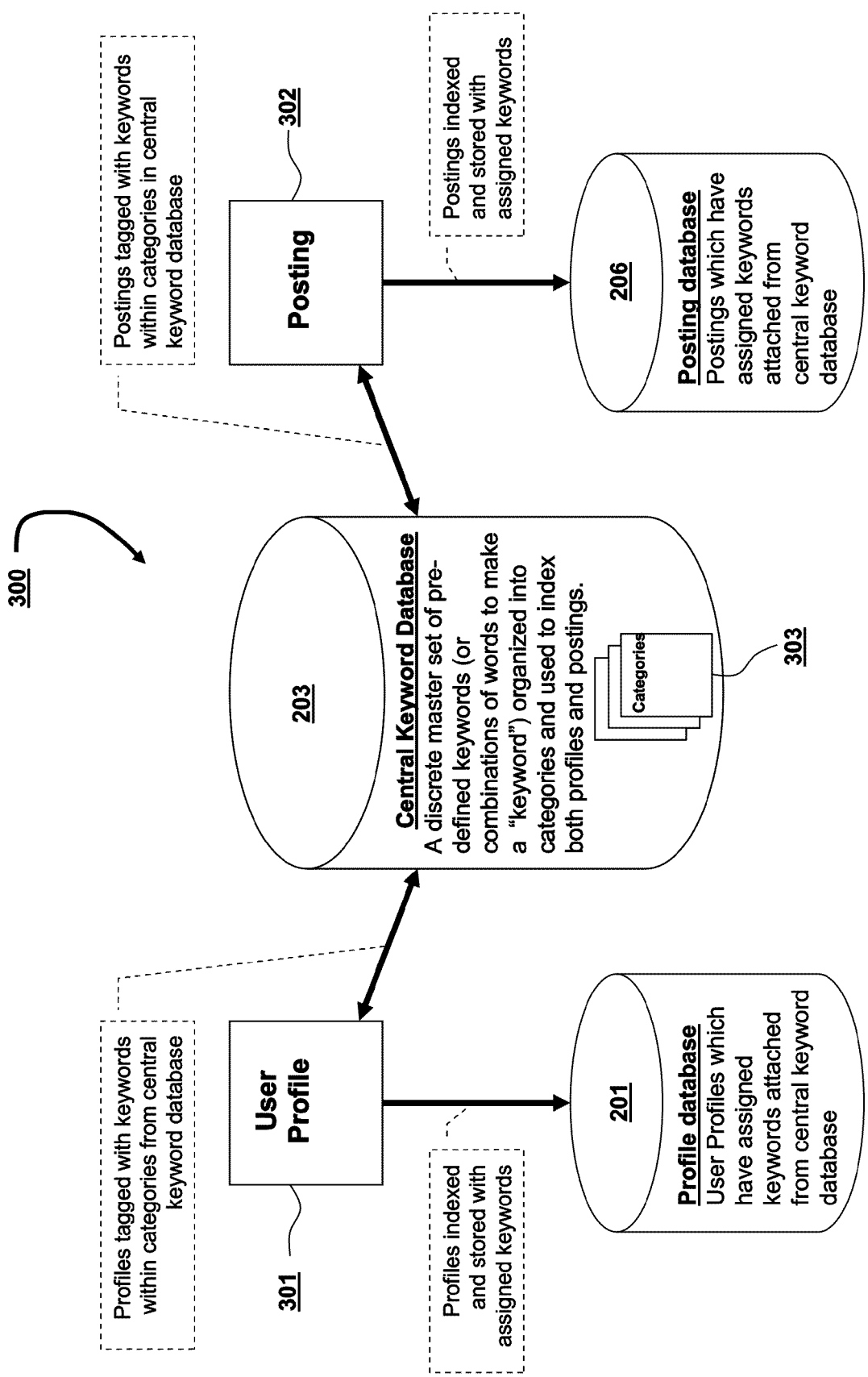
FIG. 3 illustrates an exemplary environment 300 for utilizing the central keyword database.

FIG. 3 illustrates an exemplary environment 300 for utilizing the central keyword database 203 for tagging user profiles 301 and postings 302 with keywords stored under categories 303 within the central keyword database 203. The categories 303 carry different classifications, which affect matching algorithms. Once user profiles 301 and postings 302 are tagged with keywords, they become indexed according to their keywords and stored respectively in the user profile database 201 and posting database 206.

Figure 4:
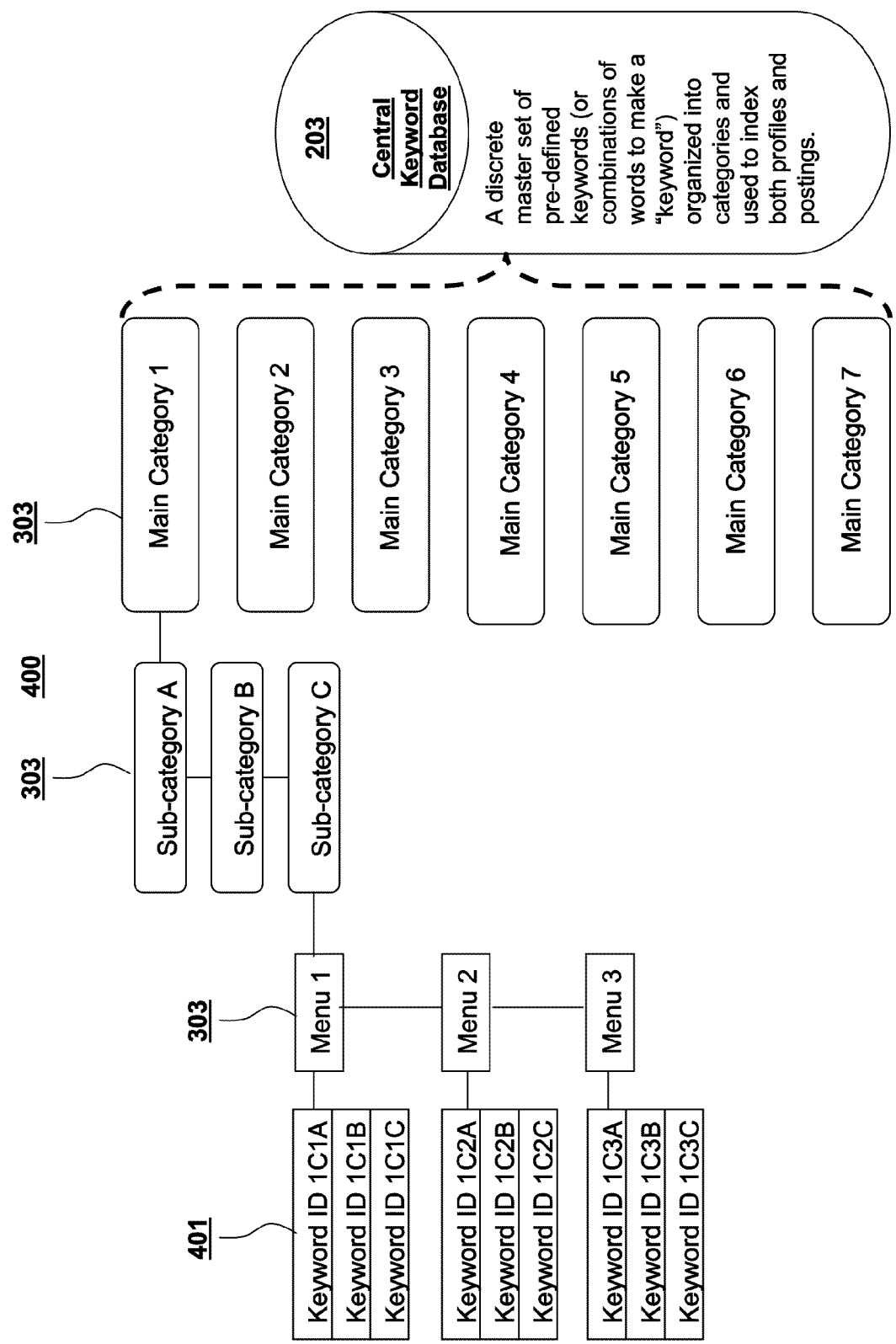
FIG. 4 illustrates an exemplary environment 400 for organizing keywords under categories.

FIG. 4 illustrates an exemplary environment 400 for organizing keywords 401 under categories 303 within the central keyword database 203. The categories 303 are assigned classifications which affect searching and matching algorithms. Users 101 may select these keywords to tag profiles 301 and postings 302, or when used to construct search queries in the search engine 108. System generated postings may also be tagged with keywords. When users 101 tag their profiles 301 with certain keywords, those "profile keywords" become associated with the user 101. Similarly, when postings 302 are tagged with certain keywords, those "posting keywords" become associated with the particular event posting, job posting, request posting, question posting, statement posting, news posting, etc. that is being submitted.

Figure 5:
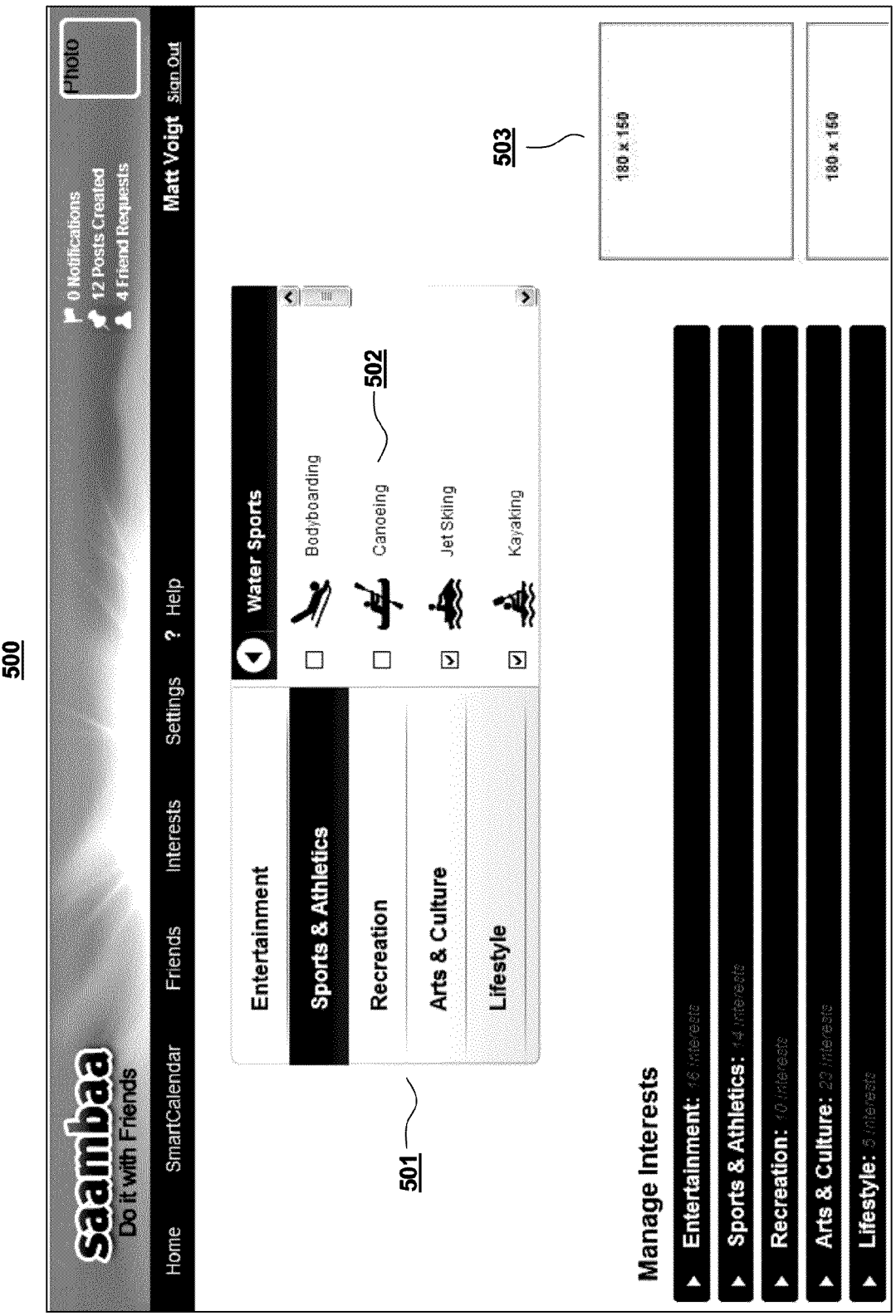
FIG. 5 illustrates an exemplary screen shot 500 of one embodiment of a keyword tag selection process for a viewing user.

FIG. 5 illustrates an exemplary screen shot 500 of one embodiment of a keyword tag selection process for a viewing user 101a. The exemplary screen shot 500 represents a display page showing one embodiment of both a category selection process 501 and keyword selection process 502, which uses a menu-based selection system to access keywords stored in the central keyword database 203. It should be noted that in other embodiments the viewing user 101a may have a different category and keyword selection process, which in some embodiments could be automated. For example, a user may become associated with certain "profile keywords" based on their search activity, postings, through data imported from other sites the user belongs to, or in other automated ways. The exemplary screen shot 500 also represents one embodiment of a display area 503. The display area 503 may display sponsored advertisements related to the user's profile keywords, postings, or other information such as current keyword trends or other keyword-related data or statistical information.

Figure 6:
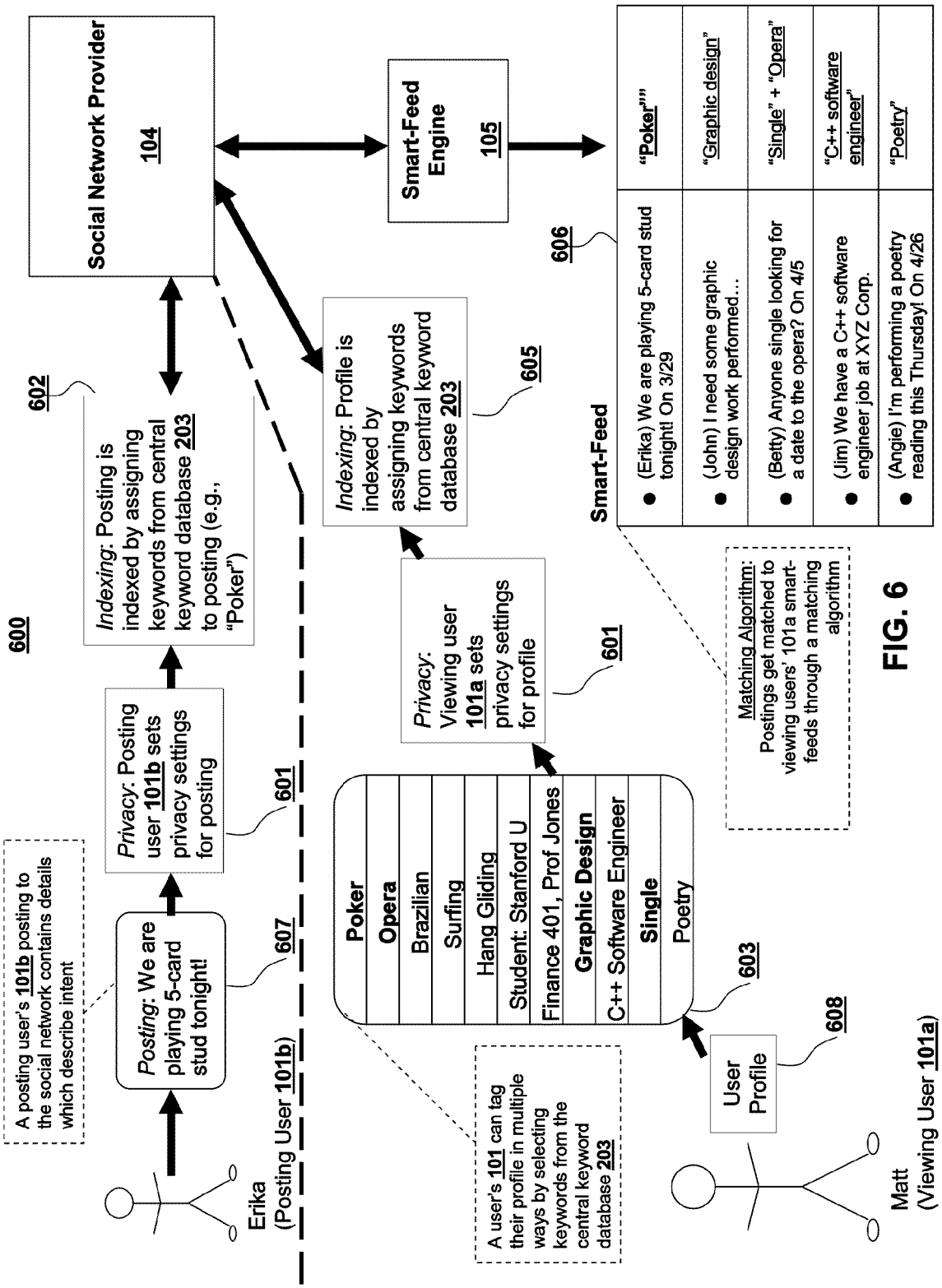
FIG. 6 illustrates an exemplary environment 600 for the process of matching a posting user's posting to a viewing user's smart-feed.

FIG. 6 illustrates an exemplary environment 600 for the process of matching a posting user's 101*b* posting 607 to a viewing user's 101*a* smart-feed 606. The process includes a viewing user 101*a* selecting keywords 603 from the central keyword database 203 to tag their user profile 608. Such keywords become "profile keywords" 603 which are associated with the viewing user 101*a*. In certain embodiments the viewing user 101*a* may select privacy settings 601 for the profile keywords 603. The profile keywords 603 are then used to index 605 the viewing user's 101*a* profile 608 in the social network 104. A posting user 101*b* can create a posting 607, select privacy settings 601 for the posting, and select keywords from the central keyword database 203 to tag the posting 607. Such keywords become "posting keywords" which are associated with the posting 607. It should also be noted that system generated postings can also be tagged with keywords, and those keywords should also be considered as "posting keywords". The posting keywords are then used to index 602 the posting user's 101*b* posting 607 in the social network 104. A smart-feed engine 105 determines if a user's posting 607 should be matched to a viewing user's 101*a* smart-feed 606 based on a matching algorithm which, among other things, takes into account the privacy settings 601 of the posting user 101*b*, the privacy settings 601 of the viewing user 101*a*, the posting keywords with which the posting 607 is tagged and how those keywords relate to the viewing user's 101*a* profile keywords 603. If the smart-feed engine 105 determines if there is a proper match between a posting user's 101*b* posting 607 and a viewing user's 101*a* profile 608, the posting 607 automatically becomes displayed in the viewing user's 101*a* smart-feed 606.

For example, in FIG. 6, the viewing user 101*a*, Matt, may tag his profile in multiple ways by selecting keywords from a central keyword database 203 to be associated with his user profile 608. Such profile keywords 603 may reflect Matt's interests, activities, characteristics, or other aspects related to or about Matt, viewing user 101*a*. For example, Matt 101*a* may indicate his interests in "Poker", "Opera", "Surfing", "Hang Gliding" or "Poetry" by selecting such keywords from the central keyword database 203 to be included in his profile keywords 603. Matt 101*a* may also indicate that he is of "Brazilian" descent. In other instances, the same profile keyword "Brazilian" may indicate that Matt is interested in "Brazilian" food or "Brazilian" culture, depending on the category of the keyword. Matt may also indicate that he is a student at Stanford, by selecting the profile keyword "Student: Stanford U" or that he is enrolled in or has previously taken the "Finance 401" class. Further information on "Finance 401" may be available in a description, including information about the class, the class type, or that the class is taught by "Professor Jones". It can be appreciated that numerous other profile keywords 603 can be chosen from the central keyword database 203 by Matt 101*a*, including but not limited to "Graphic Design", "C++Software Engineer", or "Single".

The posting user 101*b*, Erika, may post to a social network certain event postings, job postings, request postings, question postings, statement postings, news postings, etc. In FIG. 6, an example of an event posting "We are playing 5-card stud tonight!" is shown. Erika 101*b* may set certain privacy settings for the posting. For example, Erika 101*b* may limit the posting 607 to be viewed by only Erika's friends, or only friends of friends (i.e. 2-degree friends), or only those who are students at Stanford, etc. Erika's posting may be assigned keywords from the central keyword database 203 to the posting. Such keywords assigned to the posting are "posting keywords." A matching algorithm may then match the profile keywords of viewing users to posting keywords of postings. In one embodiment, when a posting is matched to a viewing user, the viewing user 101*a* may view the posting in his or her smart-feed 606. In this example, because Matt's 101*a* profile keyword "Poker" matches Erika's posting keyword, Matt 101*a* is notified of Erika's posting 607 via his smart-feed 606.

It should be noted that a user 101 may not need to manually select profile keywords 603 from the central keyword database 203 to tag their profile 608, and that this process can be accomplished through automated means regardless of whether the keyword(s) 603 are specifically mentioned in the profile. It should also be noted that a posting user 101*b* may not need to manually select posting keywords from the central keyword database 203 to tag their posting 607, and that this process can be accomplished through automated means regardless of whether the keyword(s) are specifically mentioned in the posting. It should be further noted that a viewing user's 101*a* smart-feed 606 is not the only place where a posting 607 matched by the smart-feed engine 105 becomes displayed for the viewing user 101*a*, and the display may be inside or outside the social network 104 environment, may be displayed as a result of a search, in the user's smart-calendar or through other means not specifically described herein.

Figure 7:
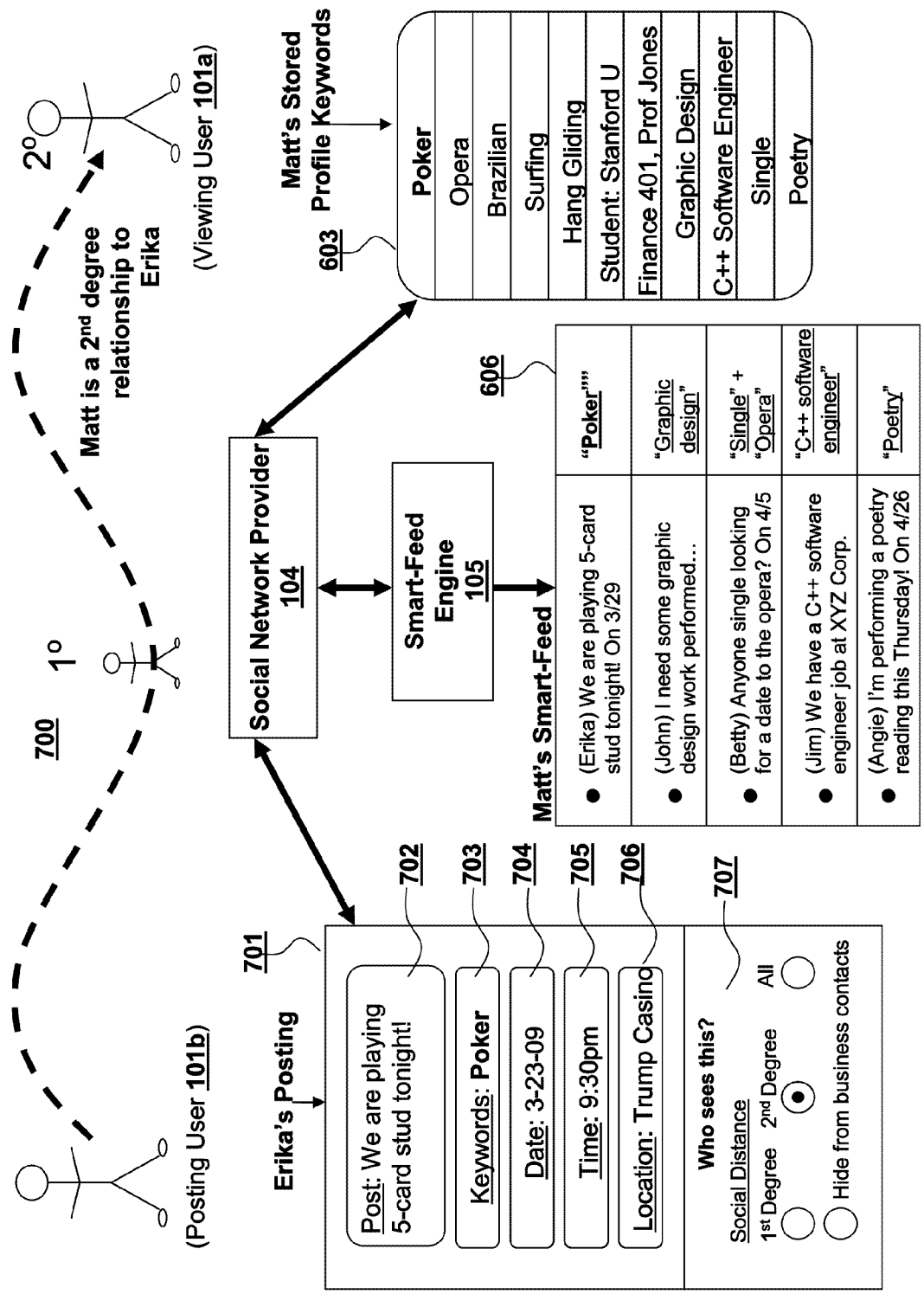
FIG. 7 illustrates an exemplary environment 700 for the process of creating an event-related posting which may be displayed in a viewing user's smart-feed.

FIG. 7 illustrates an exemplary environment 700 for the process of creating an event-related posting 701 which is displayed in a viewing user's 101*a* smart-feed 606. The posting user 101*b* creates a title 702, selects a keyword tag 702 from the central keyword database 203, selects a date 704, selects a time 705, selects a location 706, and selects privacy settings 707 which may include social distance, relationship segmentation, geographic distance, etc. The example posting is sent to the social network provider 104, and subsequently matched to a viewing user's 101*a* smart-feed 606 at a social distance of two degrees from the posting user 101*b*, based on a matching algorithm in the smart-feed engine 105, which takes into account, among other things, the viewing user's 101*a* profile keyword tags 603 selected from the central keyword database 203. It should also be noted that an event posting could be system generated and tagged by keywords from the central keyword database 203.

For example, the posting user 101*b*, Erika, may create an event posting 701. The title 702 may be "We are playing 5-card stud tonight." Erika may select posting keyword tag 703 "Poker" from the central keyword database 203 to be associated with the posting 701. Erika may select a date 704 to be "Mar. 23, 2009", may select a time 705 to be "9:30 pm" and the location 706 to be "Trump Casino." Erika may set privacy settings 707 such that only users with a social distance of two degrees or less may see the posting. Other options may include limiting the viewing to friends directly connected to Erika, or to hide the posting from business contacts, or to limit it to certain specific users or groups. As described above, the matching algorithm may determine whether any viewing users 101*a* match the posting 701, taking into account profile keywords 603, posting keywords 703, and other privacy settings. In addition, in cases where a posting 701 has multiple keywords 703 attached, the matching algorithm may take into account certain groupings of these keywords 703 as part of the matching process. For example, in scenario A, if a posting 701 is tagged with a group of three keywords 703, the matching algorithm may only match the posting to a viewing user 101a if the viewing user has all three posting keywords 703 as profile keywords 603. Alternatively, in scenario B, if a posting 701 is tagged with a different group of three keywords 703, the matching algorithm may match the posting 701 to a viewing user 101a if the viewing user has any one of the three posting keywords 703 as profile keywords 603. In addition, the matching algorithm could take into account any combination of scenarios A and B and with any number of posting keywords 703. The matching algorithm may take into account keyword groupings for the smart-feed engine 105, smart-calendar engine 106 and the search engine 108. In the case of the smart-feed engine 105, if the matching algorithm matches a posting to a viewing user, then the viewing user 101a may view the matching posting in his or her smart-feed 606. It should be noted that the exemplary environment 700 represents an event-related posting, and other types of postings may not require the same data input.

In another example, the system may generate a posting from a third party website. For example, a group buying website may post opportunities for discounts for a certain purchase which would only be available if enough people buy. The group buying website may additionally have this post posted as a system generated post within the system—and matched to users with specific interests or specific profile keyword tags.

Figure 8:
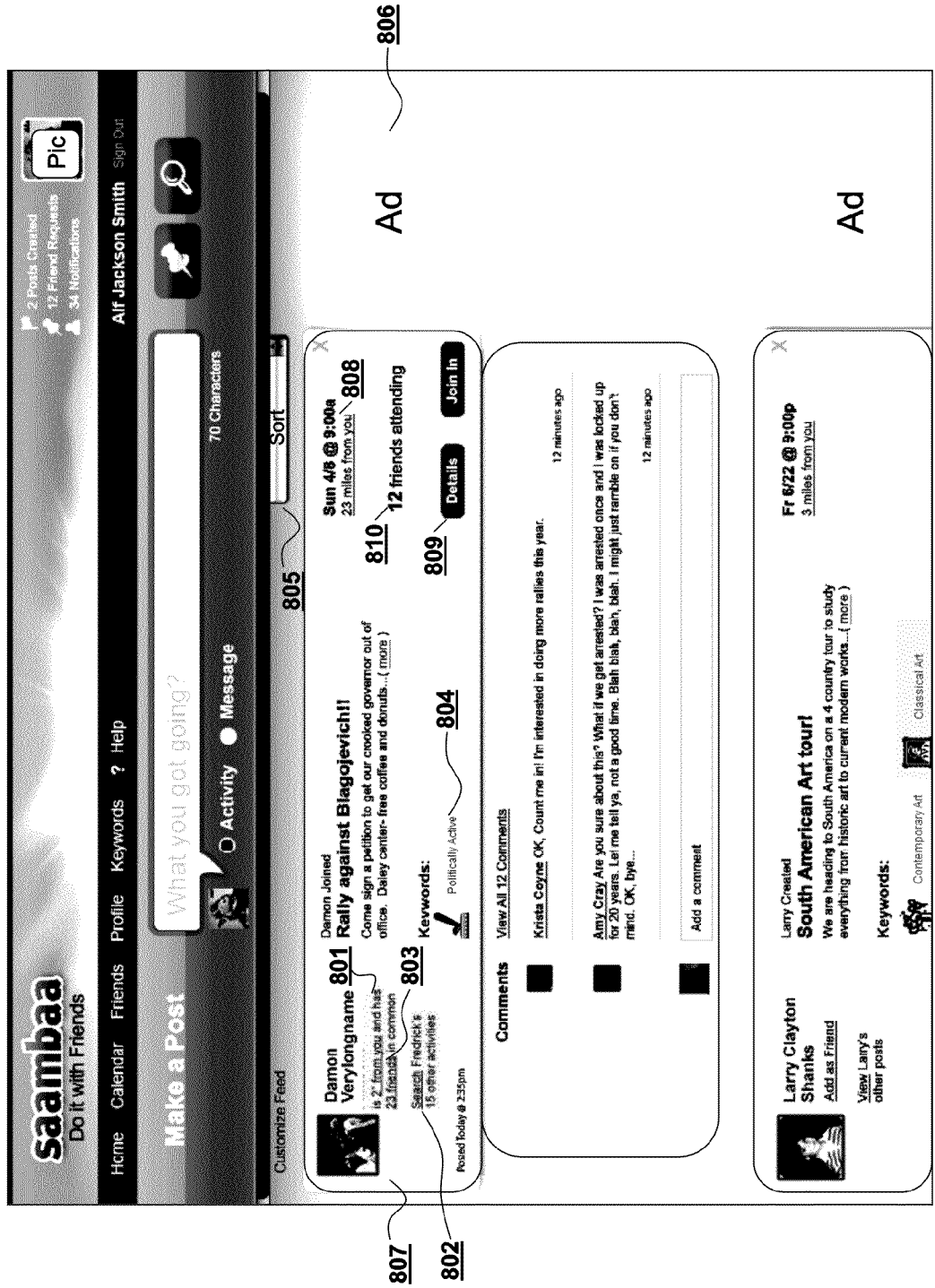
FIG. 8 illustrates an exemplary screen shot 800 of the smart-feed.

FIG. 8 illustrates an exemplary screen shot 800 of the smart-feed. The smart-feed is a dynamic list of postings 607 which are matched to the viewing user 101a by the smart-feed engine 105. The list may be comprised of a predetermined number of postings, and may place the most recent postings on top of the list while pushing the oldest postings to the bottom of the list for each new posting.

In the exemplary screen shot, the smart-feed display contains postings 807, which contain data relevant to an event-related posting, or any other kind of posting which may be available such as a job posting, news posting, etc. In one embodiment, the posting contains information such as social distance 801 between the viewing user 101a and posting user 101b, the number of common first-degree relationships ("friends") 803 between the viewing user 101a and posting user 101b, the ability search other postings 802 by the posting user 101b, keyword posting tag(s) 804 from the central keyword database 203 selected by the posting user 101b, event date, time and location information 808, number of friends attending 810 and the ability to view additional details or join the event 809.

In certain embodiments, the posting modules 807 can have advertisements 806 posted along side each posting 807. These advertisements 806 may be targeted by posting tag keywords 804 attached to the posting.

The smart-feed may contain a sorting function 805 which allows a viewing user 101a to sort the smart-feed by date/time, posting user name, social distance 801 of the posting user, the number of common first-degree relationships ("friends") 803, chronological posting order, geographic distance of event, or other data points associated with the posting.

Figure 9:
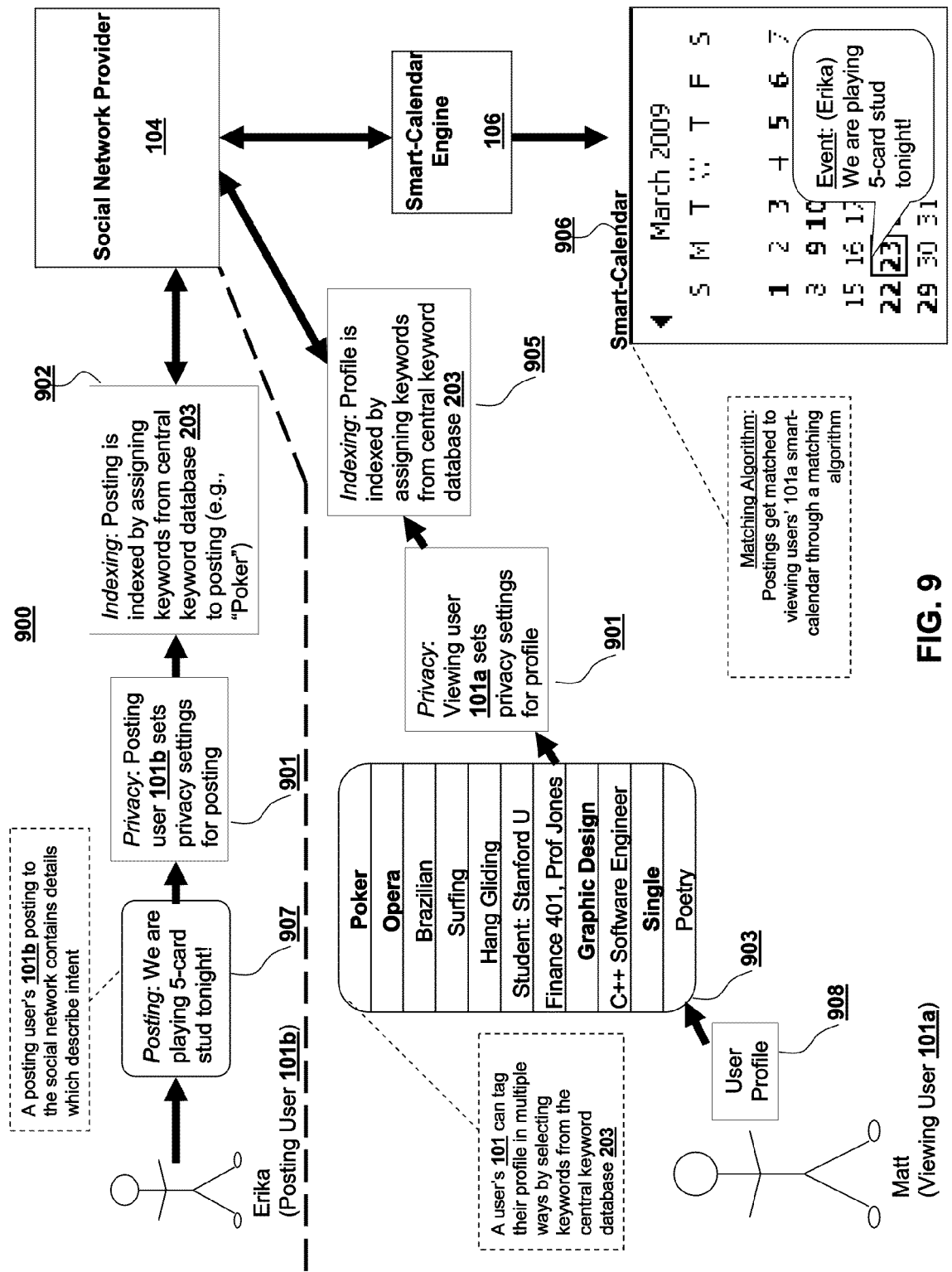
FIG. 9 illustrates an exemplary environment 900 for the process of matching a posting user's posting to a viewing user's smart-calendar.

FIG. 9 illustrates an exemplary environment 900 for the process of matching a posting user's 101b posting 907 to a viewing user's 101a smart-calendar 909. The process includes a viewing user 101a selecting keywords 903 from the central keyword database 203 to tag their user profile 908. In certain embodiments the viewing user 101a may select privacy settings 901 for the keywords 903, the keywords 903 are then used to index 905 the viewing user's 101a profile 908 in the social network 104. A posting user 101b can create a posting 907, select privacy settings 901 for the posting, select keywords from the central keyword database 203 to tag the posting 907, the keywords are then used to index 902 the posting user's 101b posting 907 in the social network 104. A system generated posting can also be indexed 902 with keywords from the central keyword database 203. A smart-calendar engine 105 determines if 'posting 907 should be matched to a viewing user's 101a smart-calendar 909 based on a matching algorithm which, among other things, may take into account the privacy settings 901 of the posting user 101b, the privacy settings 901 of the viewing user 101a, the keywords with which the posting 907 is tagged and how those keywords relate to the viewing user's 101a keywords 903, the degree relationship (social distance) between the viewing user 101a and the posting user 101b, and/or location of the user relative to location of the event posting (or any combination or subset of the foregoing). If the smart-calendar engine 105 determines there is a proper match between a 'posting 907 and a viewing user's 101a profile 908, the posting 907 automatically becomes displayed in the viewing user's 101a smart-calendar 906.

It should be noted that a user 101 may not need to manually select keywords 903 from the central keyword database 203 to tag their profile 908, and that this process can be accomplished through automated means regardless of whether the keyword(s) 903 are specifically mentioned in the profile. For example, certain keywords 903 from the central keyword database 203 may be assigned based on a user's information from other social networks, an uploaded resume, other keywords that the user has selected or that have been tagged to the user's profile, etc. It should also be noted that a posting user 101b may not need to manually select keywords from the central keyword database 203 to tag their posting 907, and that this process can be accomplished through automated means regardless of whether the keyword(s) are specifically mentioned in the posting. It should be further noted that a viewing user's 101a smart-calendar 909 is not the only place where a posting 907 matched by the smart-calendar engine 105 becomes displayed for the viewing user 101a, and the display may be inside or outside the social network 104 environment. A smart-calendar engine 105 determines if 'posting 907 should be matched to a viewing user's 101a smart-calendar 909 based on a matching algorithm which, among other things, may take into account the privacy settings 901 of the posting user 101b, the privacy settings 901 of the viewing user 101a, the keywords with which the posting 907 is tagged and how those keywords relate to the viewing user's 101a keywords 903, the degree relationship (social distance) between the viewing user 101a and the posting user 101b, and/or location of the user relative to location of the event posting (or any combination or subset of the foregoing). It should be understood that any combination of the foregoing factors may be utilized by the matching algorithm. For example, the matching algorithm may only take into account a user's degree relationship (social distance) with another user and may not factor in other variables, such as keyword matching. Thus, a viewing user 101a may also choose to receive event postings posted by other users having a certain relationship with the viewing user 101a (e.g., a first degree relationship) in their smart-calendar 909 regardless of keyword matching.

Figure 10:
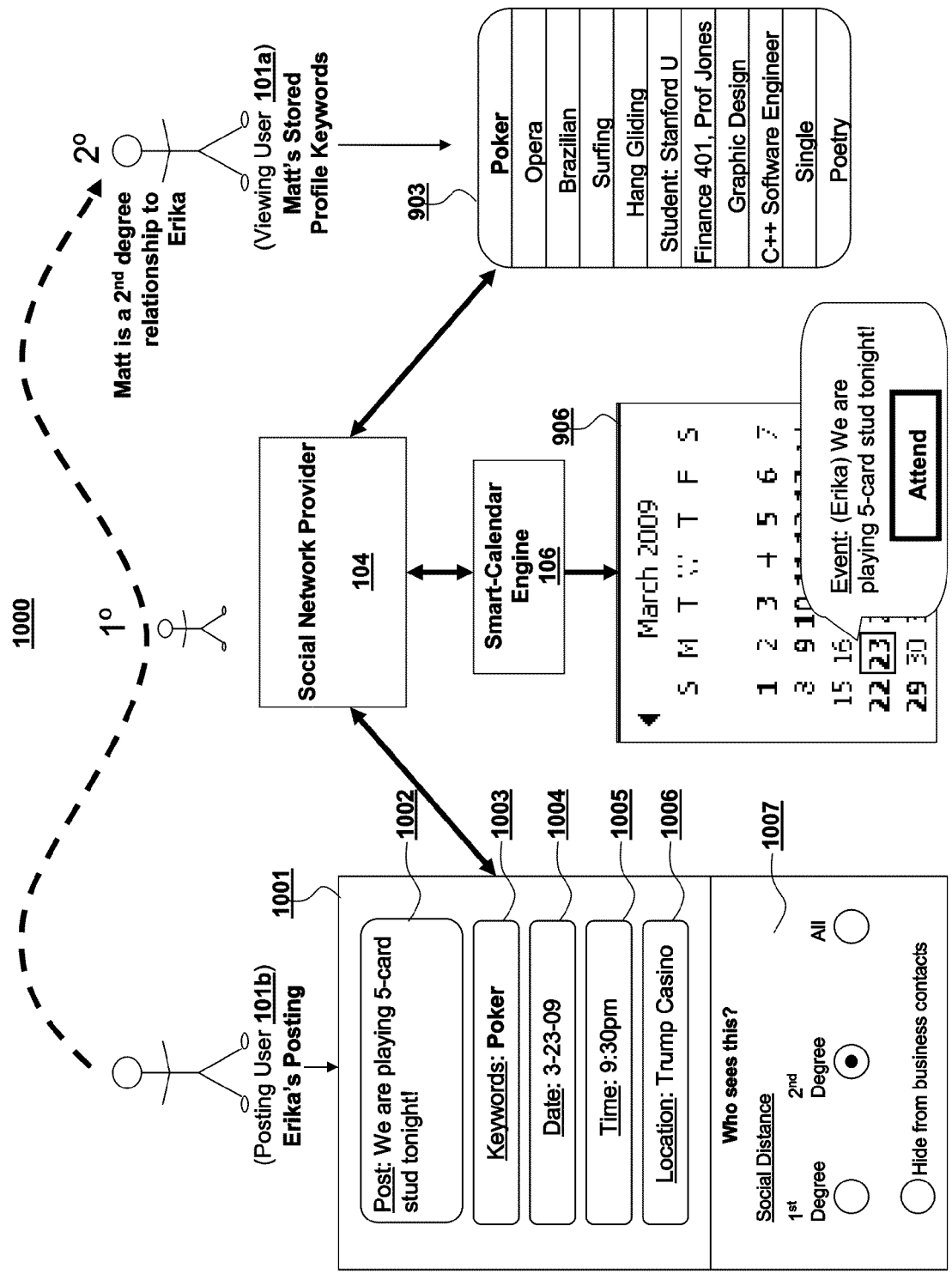
FIG. 10 illustrates an exemplary environment 1000 for the process of creating an event-related posting which gets displayed in a viewing user's smart-calendar.

FIG. 10 illustrates an exemplary environment 1000 for the process of creating an event-related posting 1001 which gets displayed in a viewing user's 101a smart-calendar 906. The example illustrates a posting generated by a posting user 101b, however the same ideas and processes may be applied to system generated postings. In this example, the posting user 101b creates a title 1002, selects one or more keyword tags 1002 from the central keyword database 203, selects a date 1004, selects a time 1005, selects a location 1006, and selects privacy settings 1007 which may include social distance, relationship segmentation, geographic distance, etc. for a particular event. The posting in this example is sent to the social network provider 104, and subsequently matched to one or more viewing user's 101a smart-calendars 906. In FIG. 10, the posting is matched to a viewing user 101a at a social distance of two degrees from the posting user 101b, based on a matching algorithm in the smart-calendar engine 106, which takes into account, among other things, the viewing user's 101a profile keyword tags 903 selected from the central keyword database 203. As shown in FIG. 10, the viewing user 101a may also have the ability to accept or reject invitations via the smart-calendar engine 106.

For example, the posting user 101b, Erika, may create an event posting 1001. The title 1002 may be "We are playing 5-card stud tonight." Erika may select posting keyword tag 1003 "Poker" from the central keyword database to be associated with the posting 1001. Erika may select a date 1004 to be "Mar. 23, 2009", may select a time 1005 to be "9:30 pm" and the location 1006 to be "Trump Casino." Erika may set privacy settings 1007 such that only users with a social distance of two degrees or less may see the posting. Other options may include limiting the viewing to friends directly connected to Erika, or to hide the posting from business contacts, or to limit it to certain specific users or groups. As described above, the matching algorithm may determine whether any viewing users 101a match the posting 1001, taking into account profile keywords, posting keywords, and other privacy settings (or any combination or subset of the foregoing). If the matching algorithm matches a posting to a viewing user, then the viewing user 101a may view the matching posting in his or her smart-calendar 906 through the smart-calendar engine 106.

It should be noted that the exemplary environment 1000 represents an event-related posting, and other types of postings may not require the same data input.

Figure 11:
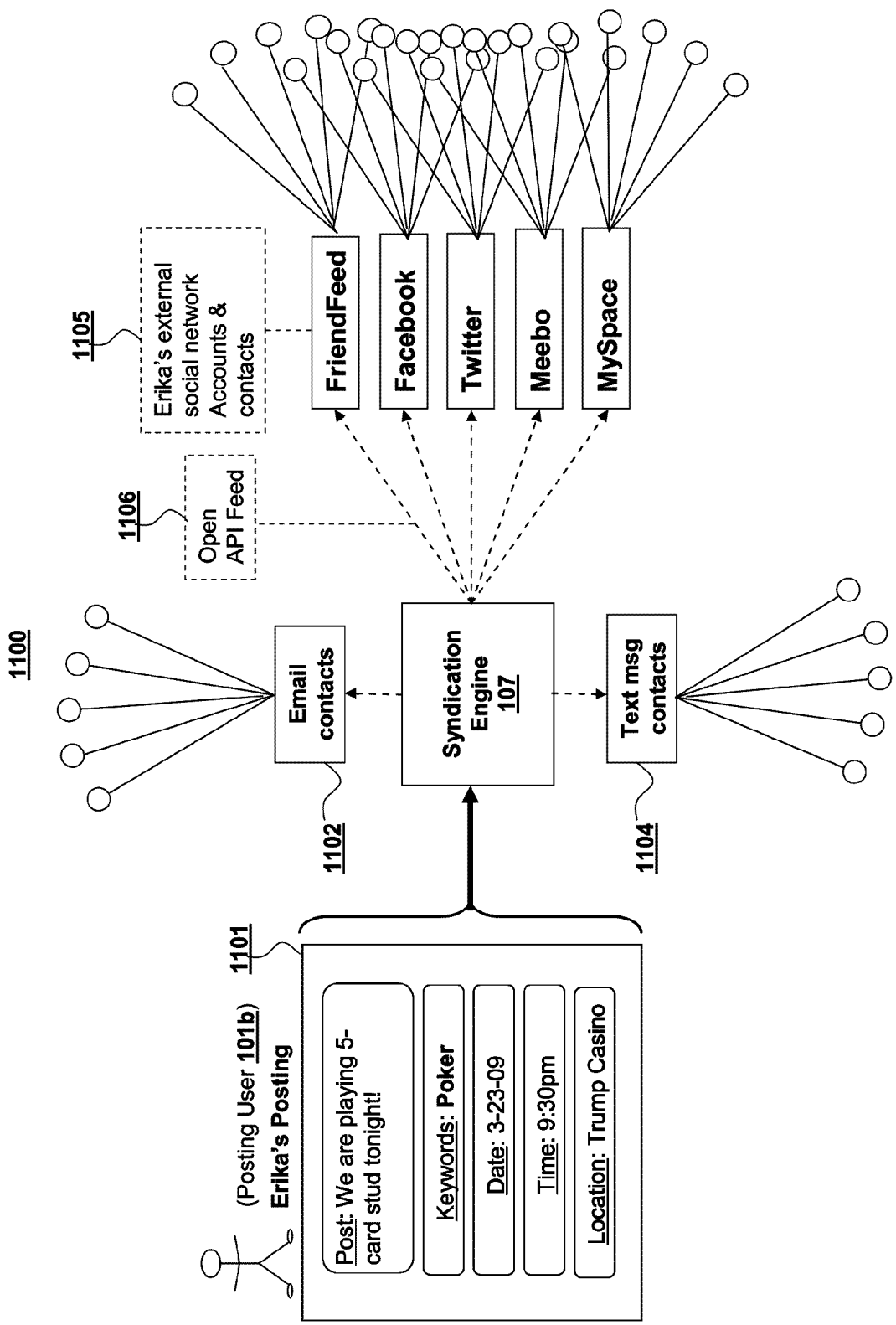
FIG. 11 illustrates an exemplary environment 1100 for the process of feed syndication for a posting user's event posting submission.

FIG. 11 illustrates an exemplary environment 1100 for the process of feed syndication for a posting user's 101b event posting submission 1101. A posting user 101b is able to broadcast their posting 1101 outside the social network provider 104 through the syndication engine 107. The syndication engine 107 can take the posting 1101 and syndicate to a posting user's 101b external relationships via email 1102, text message 1104, and through open APIs 1106 (Application Programming Interfaces) to the posting user's 101b relationships on other social networks 1105, such as FriendFeed, Facebook, Twitter, Meebo, MySpace, and others.

It should be noted that the exemplary posting 1101 represents an event-related posting, and other types of postings may use the syndication engine.

Figure 12:
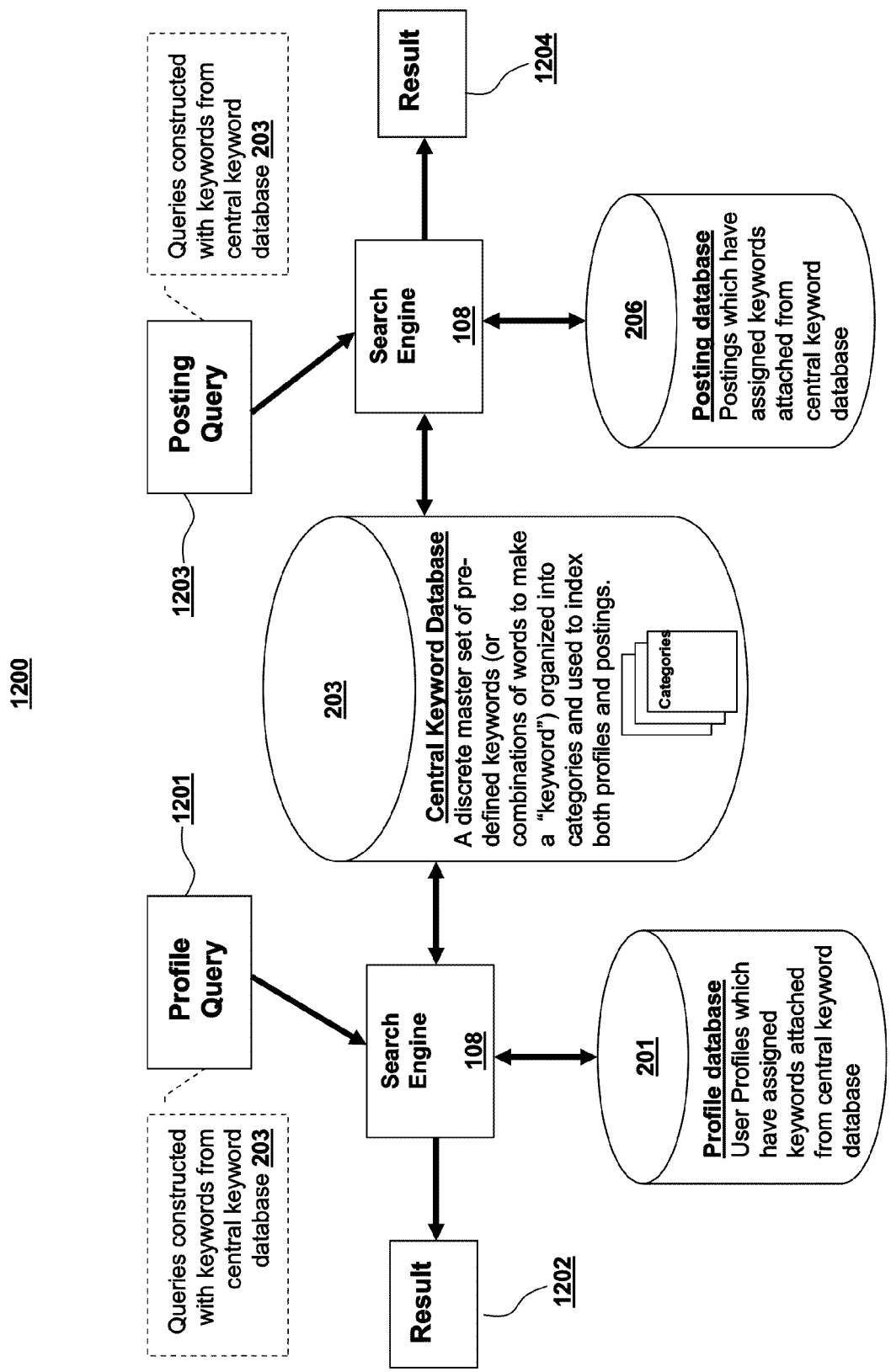
FIG. 12 illustrates an exemplary environment 1200 for searching profiles and postings.

FIG. 12 illustrates an exemplary environment 1200 for searching profiles and postings. The process utilizes the central keyword database 203 to construct profile queries 1201 and posting queries 1203 for input into the search engine 108. In the case of a profile query 1201, a user 101 would identify the search as a profile search and enter keywords selected from the central keyword database 203 into the search engine 108, which would perform a search of the profile database 201 for profiles tagged and indexed with keywords from the central keyword database 203. The search results 1202 are produced by a search algorithm that, among other things, takes into account keywords selected. In the case of a posting query 1203, a user 101 would identify the search as a posting search and enter keywords selected from the central keyword database 203 into the search engine 108, which would perform a search of the posting database 206 for postings tagged and indexed with keywords from the central keyword database 203. The search results 1204 are produced by a search algorithm that, among other things, takes into account keywords selected.

Figure 13:
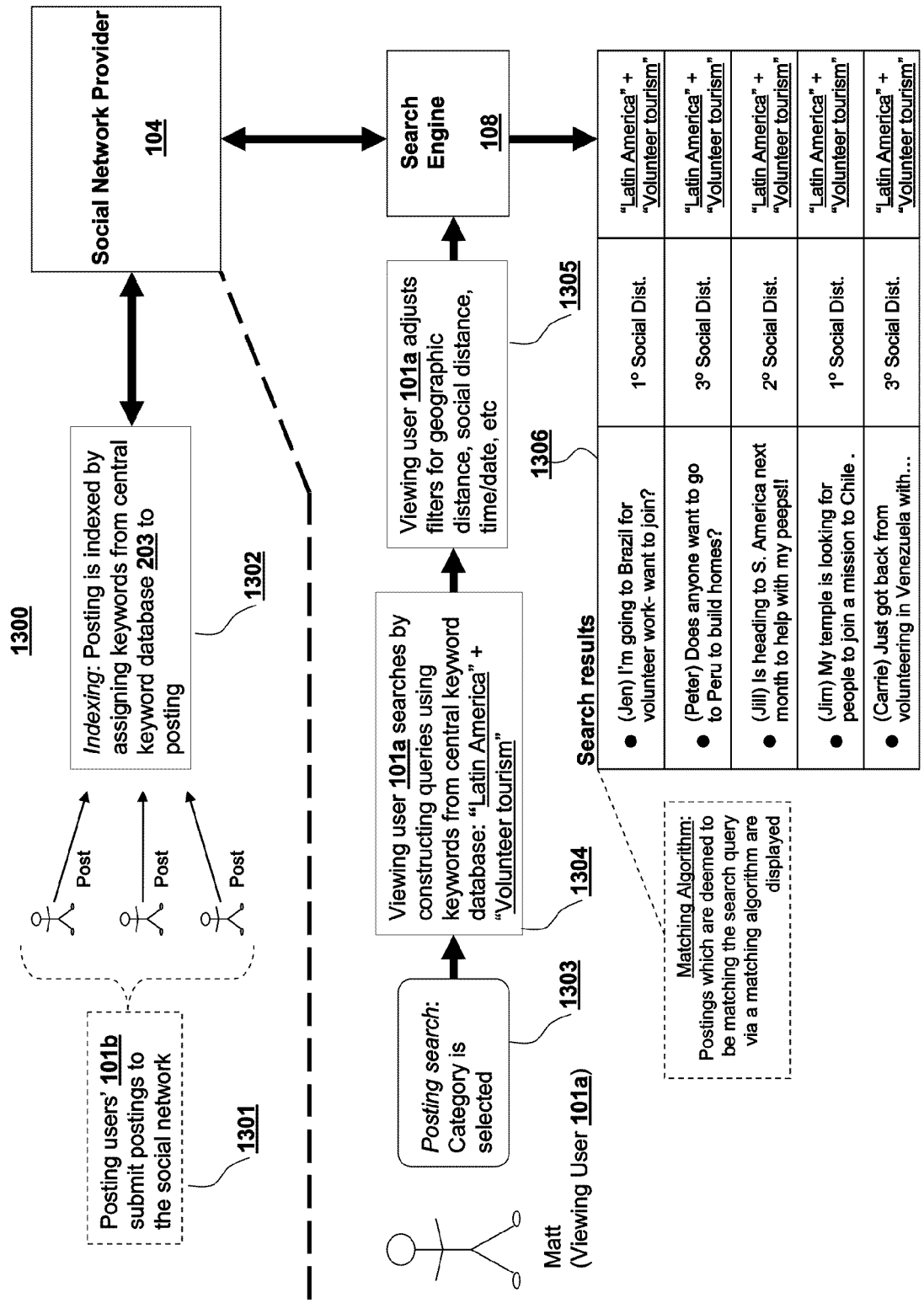
FIG. 13 illustrates an exemplary environment 1300 for the process of searching a posting.

FIG. 13 illustrates an exemplary environment 1300 for the process of searching a posting. Posting users 101b can create postings and assign keyword tags 1302 from the central keyword database 203 for indexing in the social network provider 104. The system can also generate postings and assign keyword tags 1302 from the central keyword database 203 for indexing in the social network provider 104. A viewing user 101a can select a posting category to search 1303, construct a query using keywords from the central keyword database 203, select search filters 1305 for time/date, geographical distance, social distance, etc, and input into the search engine 108 to produce the results 1306. The results 1306 are produced by a matching algorithm which, among other things, takes into account keywords selected. The results 1306 may display any/all information included in the posting based on privacy settings set for the posting by the posting user 101b.

For example, viewing user 101a "Matt" may construct a query by choosing keywords from the central keyword database "Latin America" and "Volunteer tourism." Matt 101a may then adjust certain filters such as geographic distance, social distance, time, date, etc. The query may be processed by the search engine 108 to produce results 1306 which find postings which match the search query, as shown in FIG. 13.

Figure 14:
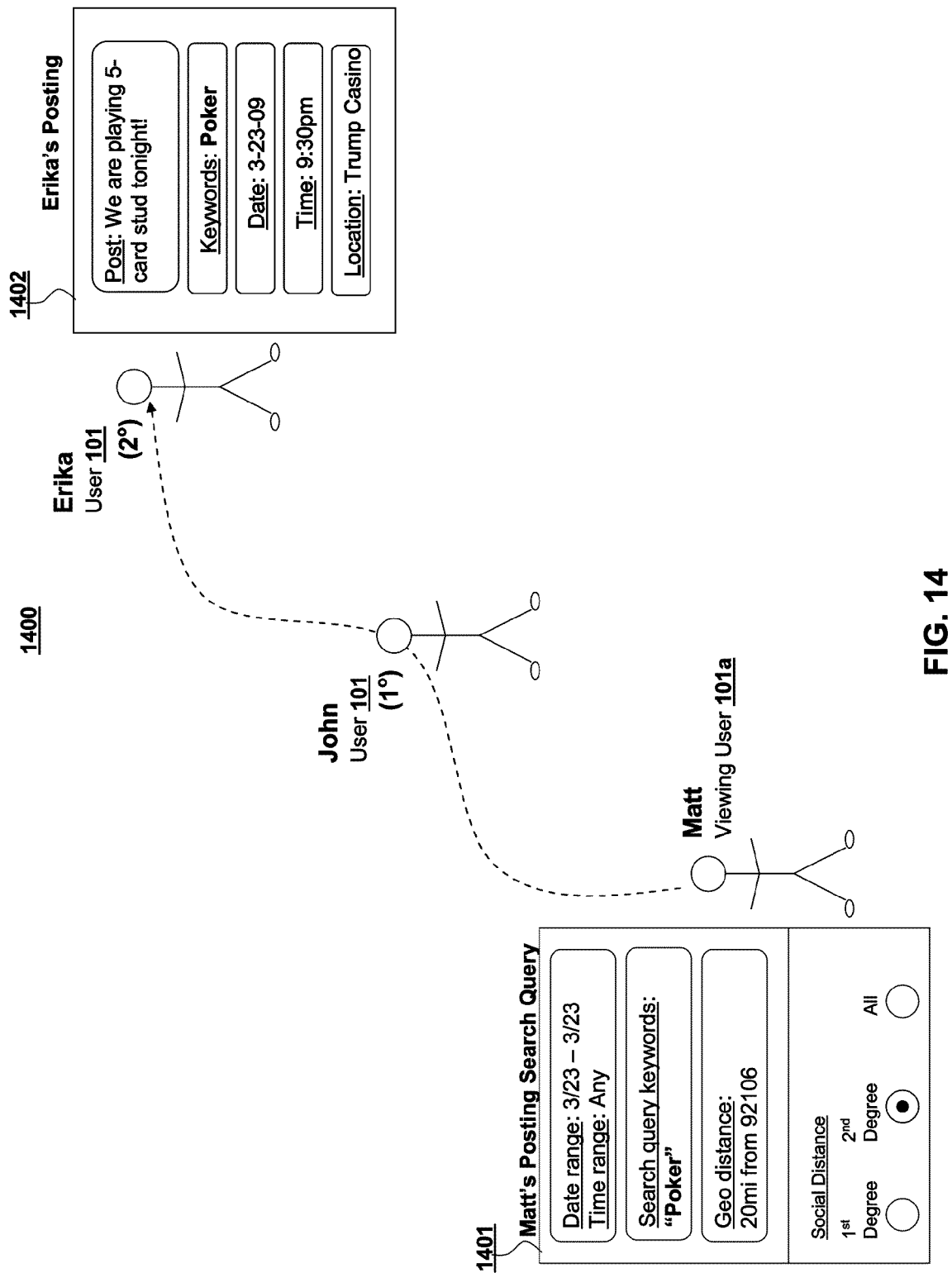
FIG. 14 illustrates an exemplary search 1400 for a posting.

FIG. 14 illustrates an exemplary search 1400 for a posting. A viewing user 101a "Matt" creates a search query 1401 specifying a date/time range, keyword selected from the central keyword database 203, geographic distance and social distance. The query produces a matching result 1402, which is a posting created by posting user 101b "Erika", who is two degrees away from the viewing user 101a "Matt" through user 101 "John". It should be noted that, in some embodiments, the viewing user 101a "Matt" may perform a query with other specifications such as with more than one keyword, no keywords, no date/time range, no limit on geographical range, etc. In addition, search query results may include not only event postings, but any other types of postings as well including job postings, news postings, advertisements, etc.

Figure 15:
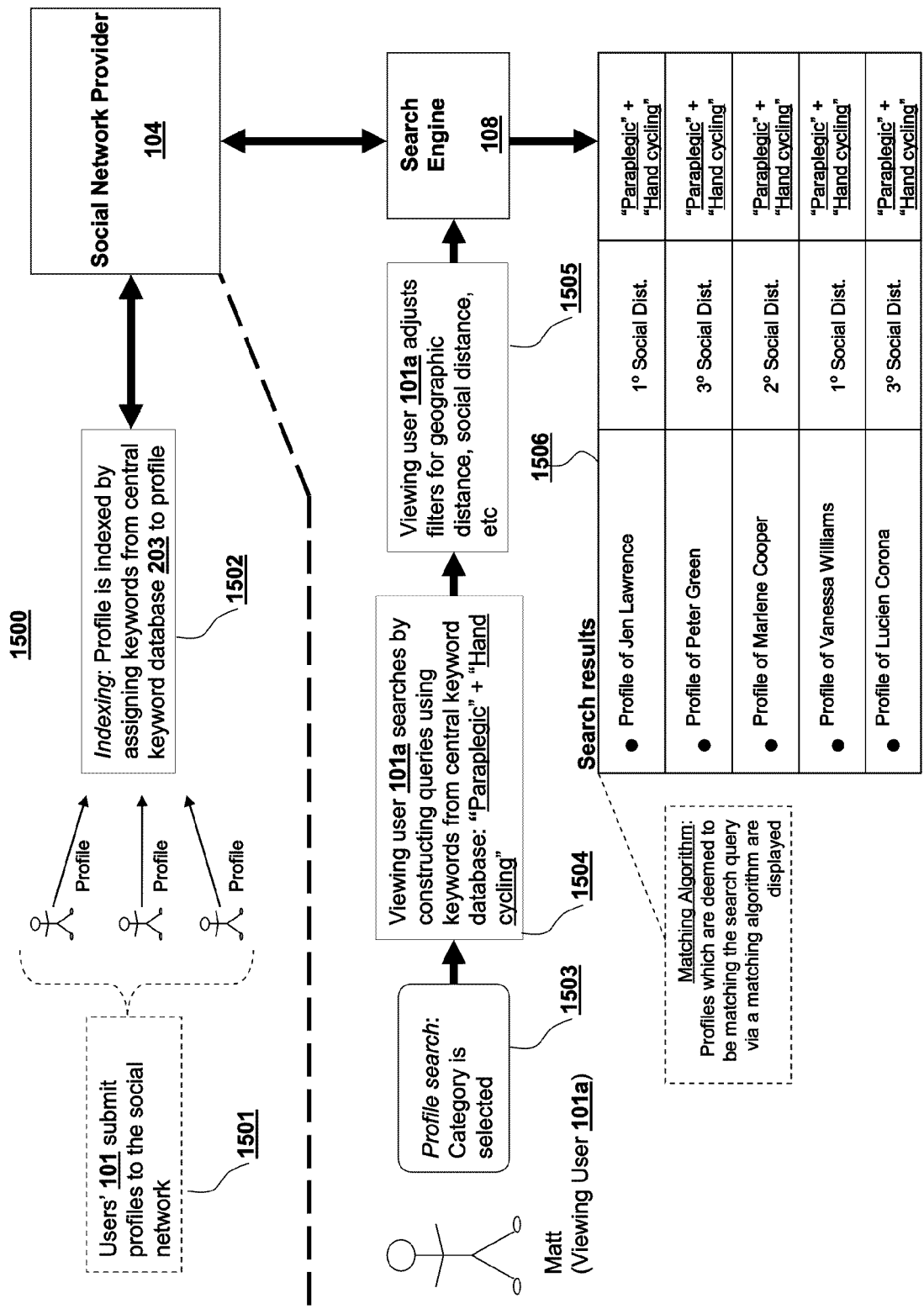
FIG. 15 illustrates an exemplary environment 1500 for the process of searching a profile.

FIG. 15 illustrates an exemplary environment 1500 for the process of searching a profile. Users 101 create profiles and assign keyword tags 1302 from the central keyword database 203 for indexing in the social network provider 104. A viewing user 101a can select a profile category to search 1503, construct a query using keywords from the central keyword database 203, select search filters 1505 for geographical distance, social distance, etc, and input into the search engine 108 to produce the results 1506. The results 1506 are produced by a matching algorithm which, among other things, takes into account keywords selected. The results 1506 may display any/all information included in the profile based on privacy settings set for profile information by the user 101.

For example, viewing user "Matt" 101a may construct a query using keywords from the central keyword database "Paraplegic" and "Hand cycling." Matt 101a may then adjust certain filters such as geographic distance, social distance, time, date, etc. The query may then be processed by the search engine 108 to produce results 1506 which find profiles which match the search query, as shown in FIG. 15.

Figure 16:
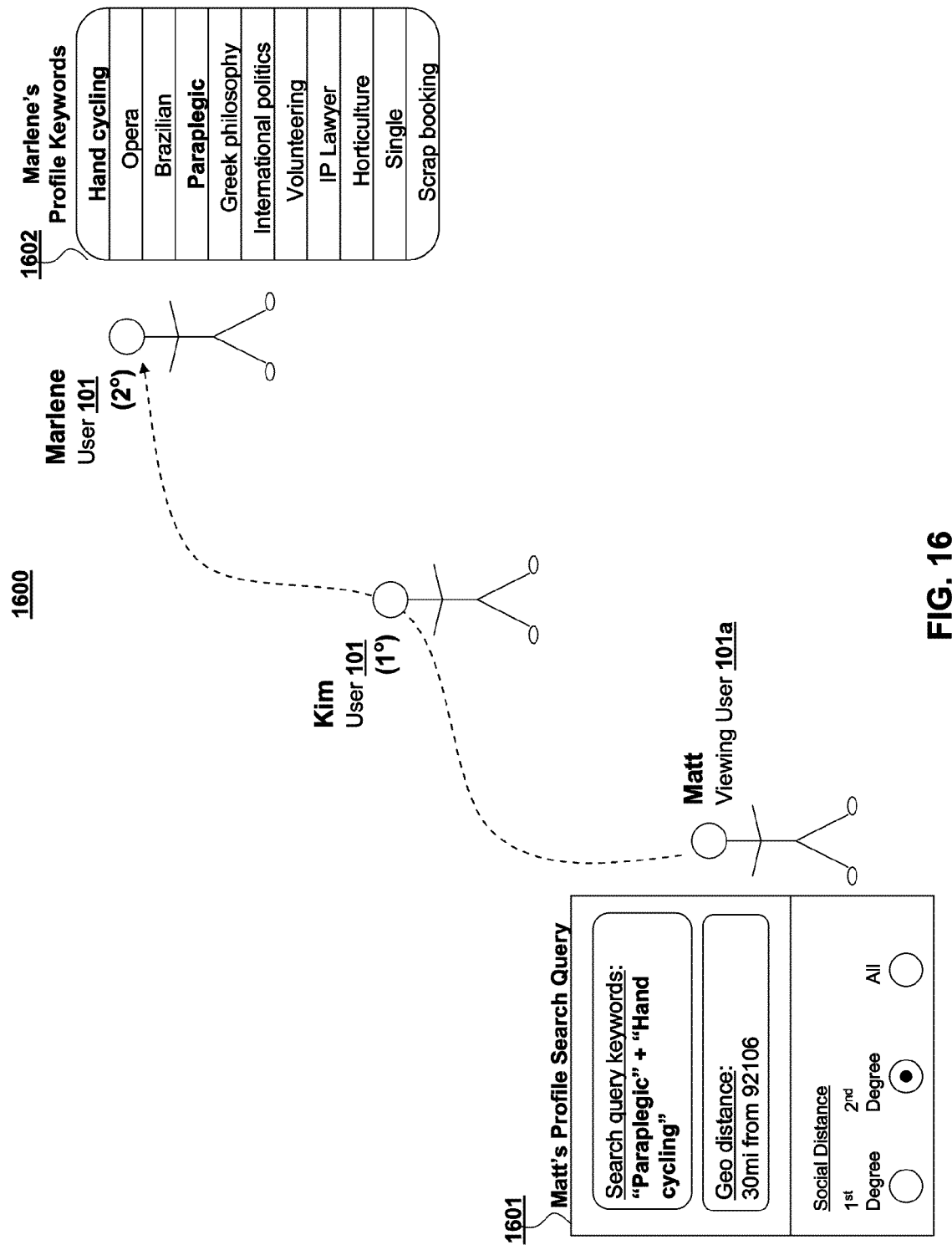
FIG. 16 illustrates an exemplary search 1600 for a profile.

FIG. 16 illustrates an exemplary search 1600 for a profile. A viewing user 101a "Matt" creates a search query 1601 specifying keywords selected from the central keyword database 203, geographic distance and social distance. The query produces a matching result 1602, which is a profile created by user 101 "Marlene", who is two degrees away from the viewing user 101a "Matt" through user 101 "Kim". It should be noted that, in some embodiments, the viewing user 101a "Matt" may perform a query with other specifications such as with more than one keyword, no keywords, no limit on geographical range, etc.

Figure 17:
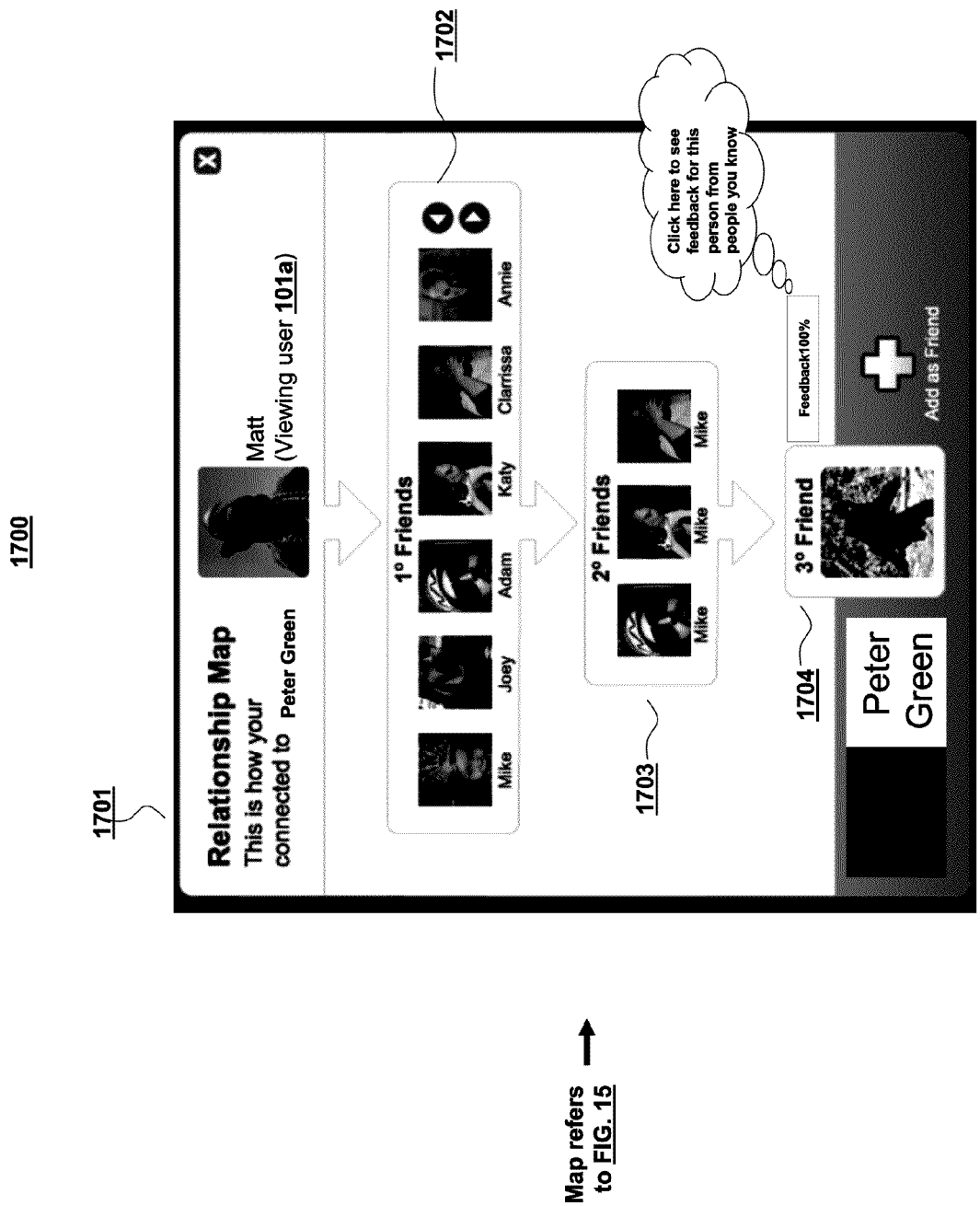
FIG. 17 illustrates an exemplary display 1700 of a relationship map.

FIG. 17 illustrates an exemplary display 1700 of a relationship map. The example relationship map 1701 refers to the search result "Peter Green" displayed in FIG. 15. The viewing user 101a "Matt" can view the relationship path to the profile search result "Peter Green" 1704 by activating a relationship map stored in the relationship database 204 and generated by the display engine/GUI 205. Viewing user 101a "Matt" can view his first degree relationships 1702 who commonly know second-degree relationships" " 1703 who in turn knows the third-degree relationship "Peter Green" 1074. It should be noted that in certain embodiments the viewing user 101a "Matt" may be able to see feedback left for users 101 as a summary displayed in the relationship map 1701. In certain embodiments users 101 may be displayed differently within the relationship map 1701, or in other embodiments the relationship map 1701 may be presented altogether differently. The exemplary display 1700 is meant to show the ability for the social network provider 104 to display a relationship map, but is not meant to be the only form of display for a relationship map.

Figure 18:
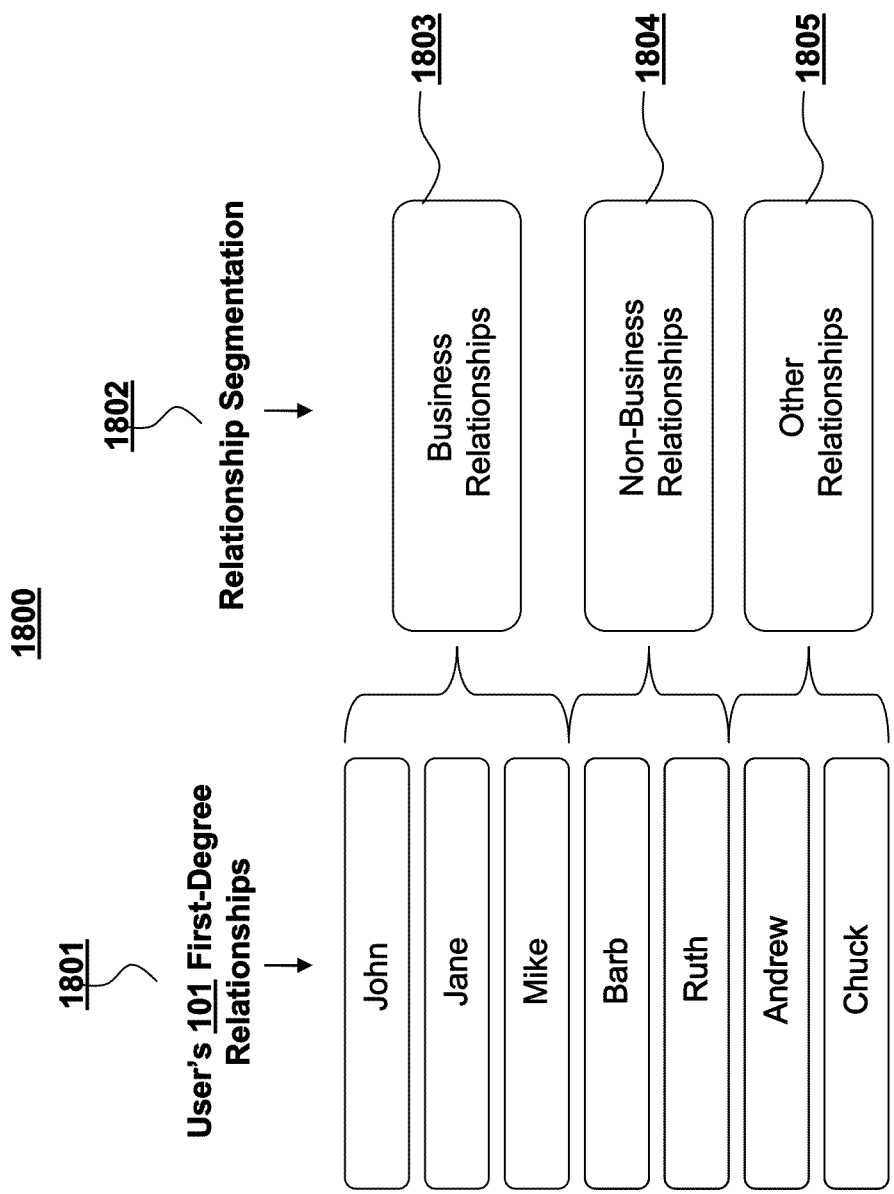
FIG. 18 illustrates an exemplary environment 1800 of first-degree relationship segmentation.

FIG. 18 illustrates an exemplary environment 1800 of first-degree relationship segmentation. A user 101 can view their first degree relationships 1801 and classify them into multiple categories 1802 which are stored in the relationship database 204. Relationship categories can be, but are not limited to, business relationships 1803, non-business relationships 1804, and other relationships 1805. Relationship categories may further capture types of relationships such as being someone's relative, spouse, or significant other. It is appreciated that the types of relationships that can be captured by categories is not limited to the specific examples discussed herein. Relationship categories can be used for privacy settings related to both user 101 profiles and postings. Relationship categories 1802 of first-degree relationships 1801 may track through and affect second-degree relationships, which in turn affect search and matching algorithms.

FIG. 19 illustrates an exemplary configuration 1900 of privacy settings which can be applied to both user 101 profiles and postings. Privacy controls factor into search and matching algorithms, and allow users to control the display of information in a multidimensional, granular way. Privacy settings include status 1902 (which activates or deactivates a keyword tag without deleting it), social distance 1903, and relationship segmentation 1904. A user 101 can select keyword tags 1901 from the central keyword database 203 to tag their profile or posting, and use the privacy controls for each and every keyword. In addition, a user 101 can apply privacy controls to certain non-keyword profile data. It can be appreciated that various types of privacy settings may be applied, and are not limited to the specific examples discussed herein.

FIG. 20 illustrates an exemplary screen shot 2000 of the smart-calendar. If the smart-calendar engine 105 determines there is a proper match between an event posting and a viewing user's 101a profile, the event posting may be automatically placed in the viewing user's 101a smart-calendar 2001. Selecting on a date may filter matching results 2003 displayed below the smart-calendar according to the date or date range selected. Dates in which a user has joined or formed events may be noted by "dog ears" (as shown), asterisks, or other type of indication. Locations of event results produced by selecting dates may be displayed on the smart-calendar map 2005; locations may be noted on the map by an icon and may display more information about that event when moused-over. Alternatively, a pin may indicate a certain event location on a map, and a user may be able to click on a pin to produce a pop-up containing additional event information.

A user may select "Customized settings" or "Advanced Options" 2004 to adjust specific calendar matching criteria (as described further below). A user may select "Friends' Activities" 2006 in order to view all events their friends (or social network connections) have joined or formed, provided their friends have privacy settings which permit those events to be viewed. A user may also view "Suggested Activities" 2008 to see all matched results. Various category filters 2009 also allow filtering by main categories (e.g., Entertainment, Sports & Athletics, Recreation, Arts & Culture, Lifestyle, etc.) and allow a user to select sub-categories (e.g., Social/Nightlife, Music, Movies & Film, Dancing, Playing Cards, Video Games, Tabletop Games, etc. within the category of Entertainment).

In the exemplary screen shot in FIG. 20, the smart-calendar display contains posting results 2003, which contain data relevant to an event-related posting. In one embodiment, the results contain information such as social distance 2007 between the viewing user 101a and posting user 101b, the number of common first-degree relationships ("friends") between the viewing user 101a and posting user 101b, the ability search other postings by the posting user 101b, keyword posting tag(s) 2014 from the central keyword database 203 selected by the posting user 101b, event date, time and location information 2010, number of friends attending 2011 and the ability to view additional details or join the event.

In certain embodiments, a user may accumulate points based on the number of activities or events that a user joins or creates. The points may accumulate according to interest. For example, a user may be able to accumulate volleyball points if the events are related to volleyball, baseball card collecting points for events related to baseball collecting etc. Once the user achieves a certain number of points, the user may receive some sort of indication (for example, a larger custom profile icon pertaining to that interest or an article of clothing which displays their favorite activity icon). A user may be able to access certain offers after achieving a certain point threshold as well. For instance, a user may be able to receive virtual currency in return for passing certain point accumulation thresholds. This virtual currency may be used to purchase items on the social network, or potentially on other social networks or systems such as game networks, or even for the purchase of physical goods. The user may also be able to accumulate enough points to earn coupons or discounts for the purchase of goods or services from partner businesses which have formed agreements with the social network.

In certain embodiments, the user may receive coupons or discounts for joining an activity or event which has been posted in the system by partner businesses which have formed agreements with the social network. These coupons or discounts could be used for the purchase of goods or services from partner businesses. In some cases, users may receive coupons or discounts for joining activities and events from system generated postings or from businesses which have not specifically partnered with the social network.

In certain embodiments, the posting results 2003 can have advertisements posted along side each result 2003. These advertisements may be targeted by using posting tag keywords attached to the posting.

The smart-calendar may contain a sorting function 2015 which allows a viewing user 101a to sort the smart-calendar by date/time, posting user name, social distance of the posting user, the number of common first-degree relationships ("friends"), chronological posting order, geographic distance of event, only events the viewing user is attending, or other data points associated with the posting.

Figure 21:
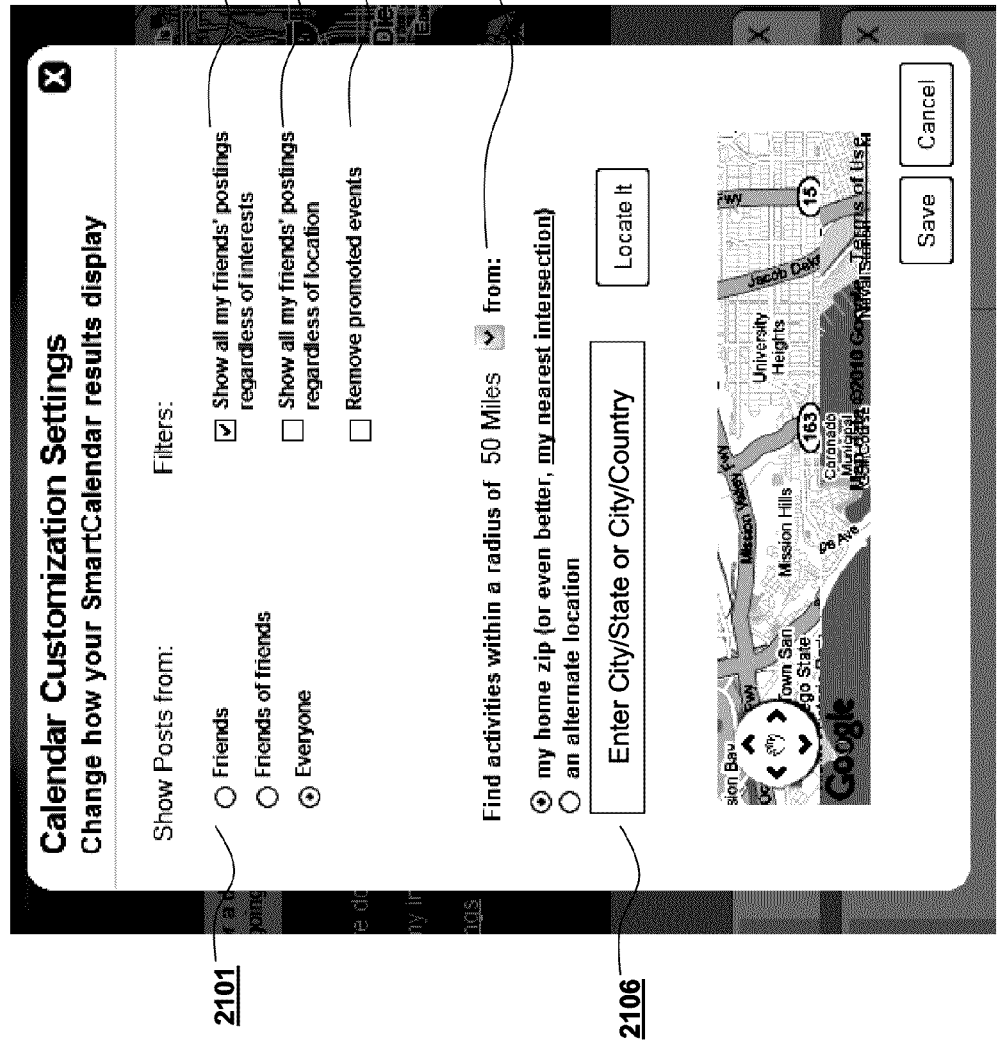
FIG. 21 illustrates an exemplary screen shot 2100 of the smart-calendar custom user settings.

FIG. 21 illustrates an exemplary screen shot 2100 of the smart-calendar custom user settings. A viewing user may elect to have their smart-calendar display event postings from friends, friends-of-friends or everyone by selecting radio buttons 2101. A viewing user may elect to circumvent keyword-matching for postings in their smart-calendar by selecting "Show all my friends' postings regardless of interests" (a.k.a. "keywords") 2102. A viewing user may see all of their first-degree friends' postings regardless of the viewing user's location by selecting "Show all my friends' postings regardless of location" 2103. A viewing user may remove system generated postings in their smart-calendar by selecting "Remove promoted events" check box 2104. A viewing user may adjust the geographic distance filter for their smart-calendar by choosing a radius between their home location and event location via drop-down 2105. A viewing user may be traveling and choose to enable their smart-calendar to display event postings in other cities by entering a new city in field 2106.

FIG. 22 illustrates an exemplary screen shot of a dashboard. In one embodiment, a viewing user may view how many new activities have been posted 2201, how many new messages have been posted 2202, how many friends have joined activities 2203, and how many new comments have been made on postings in a user interface 2204. In addition, each of these numbers may be displayed in a selectable button 2201, 2202, 2203 and 2204 which may link to a user's feed page. When the user views the feed page, the number may be reset to zero, so that the number only indicates new postings that have not yet been viewed by the user. Thus, the number may be displayed based on the number of new postings in the user's feed since the last feed view. In one embodiment, a number may be displayed based on the number of new message postings in a user's feed since last feed view 2201, a number may be displayed based on the number of new message postings in the user's feed since last feed view 2202, a number may be displayed pertaining to the activities the user is attending (created or joined) which the user's friends have joined in on 2203, and a number may be displayed pertaining to the comments the user is following based on notifications data (created postings, joined postings, and postings that the user has commented on) 2204. Each of these numbers may reset after the user views the respective data or feed.

Various other types of data may also be aggregated. For example, a number may be generated by the total number of historical posts generated by the user 2205, a number may be generated by the total number of current activities (not expired) the user has created or joined 2206 (selecting this button may produce filtered results of "my posts" with only current activities the user has created or joined), a number may be generated by the total number of friend requests that the user has outstanding 2207, and a number may be generated by the total number of friend suggestions the user has outstanding 2208.

A dashboard may also include a map 2209 that displays pins of calendar activities on a map at a location of a certain activity. A "Friends' Activities" tab 2210 may display calendar results from a Smart Calendar for a user's friends' activities. A user may also be able to be alerted if friends join an event—for example, if the user clicks on a posting, a posting details page may be launched. Further, a link to a Smart Calendar may be provided. A "Suggested Activities" tab 2211 may also be available to display a user's keyword matched activities from other users within a social distance of X degrees from the user, or other suggestions from the system. When selected, the map view may change to show activities suggested. Clicking on (or mousing over) a particular pinned location on a map may produce a pop-up or bubble with information relating to the posting such as keywords matching, date/time, or other information relating to the posting.

Figure 23:
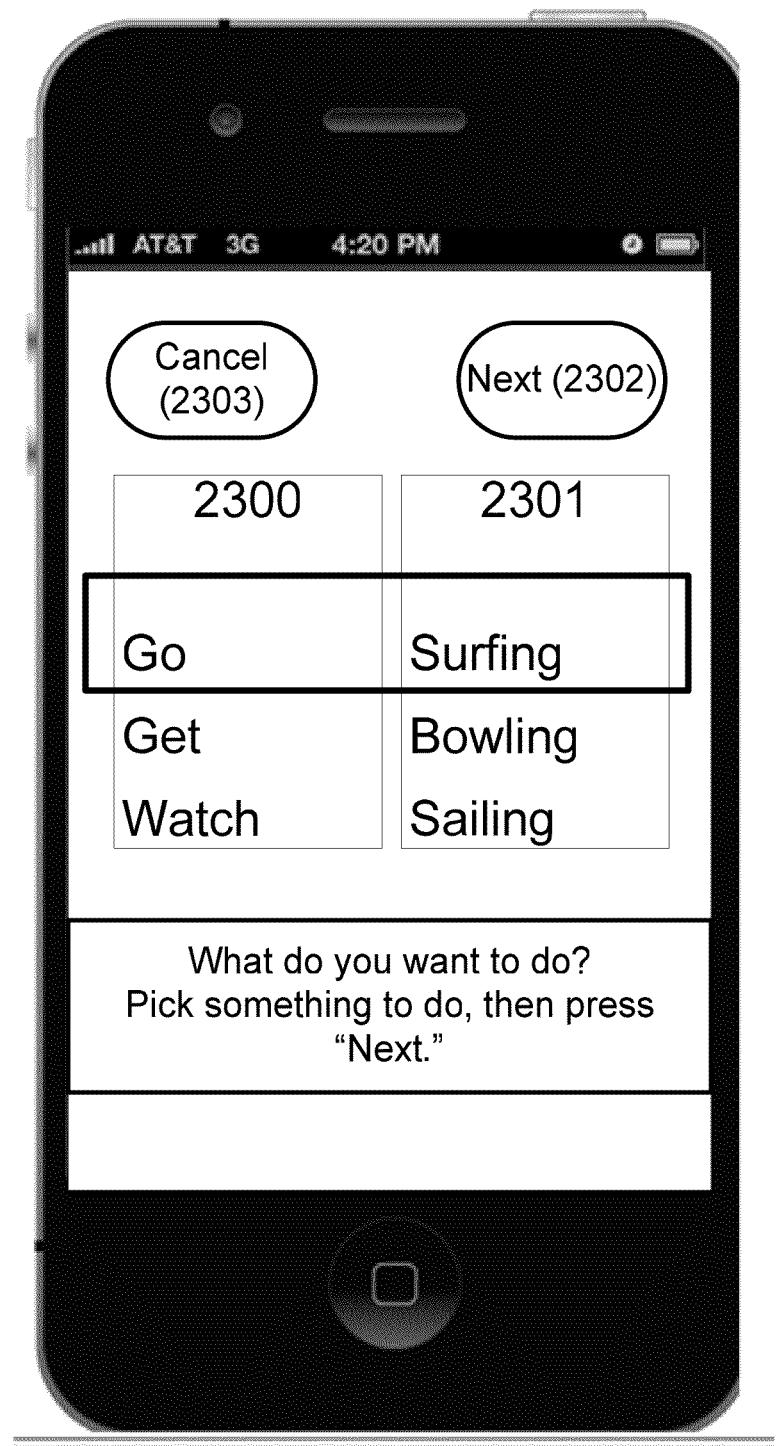
FIGS. 23, 24, 25, 26 and 27 illustrate an exemplary environment for steps in the process of creating an event-related posting using a mobile application interface.
Figure 24:
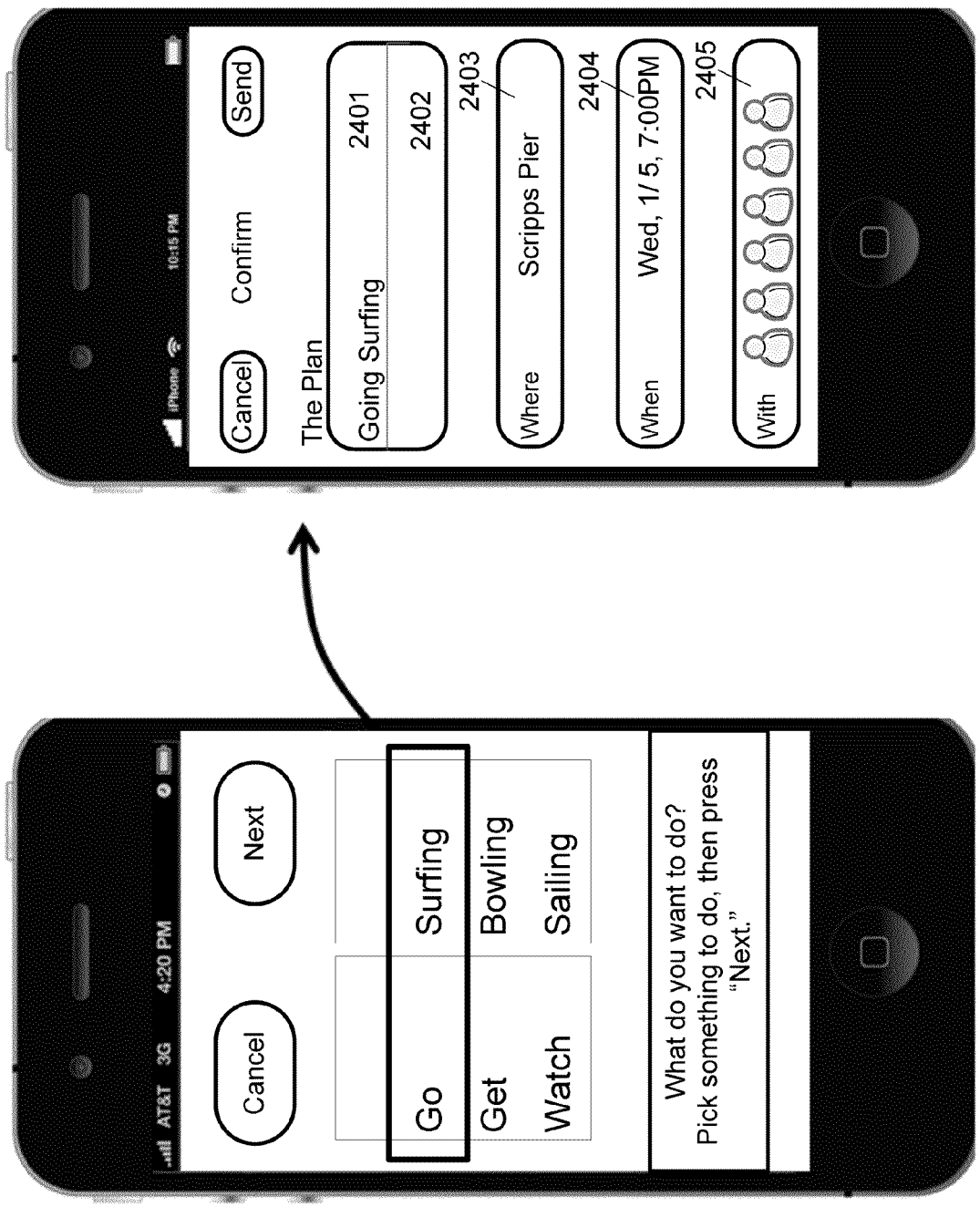
Figure 25:
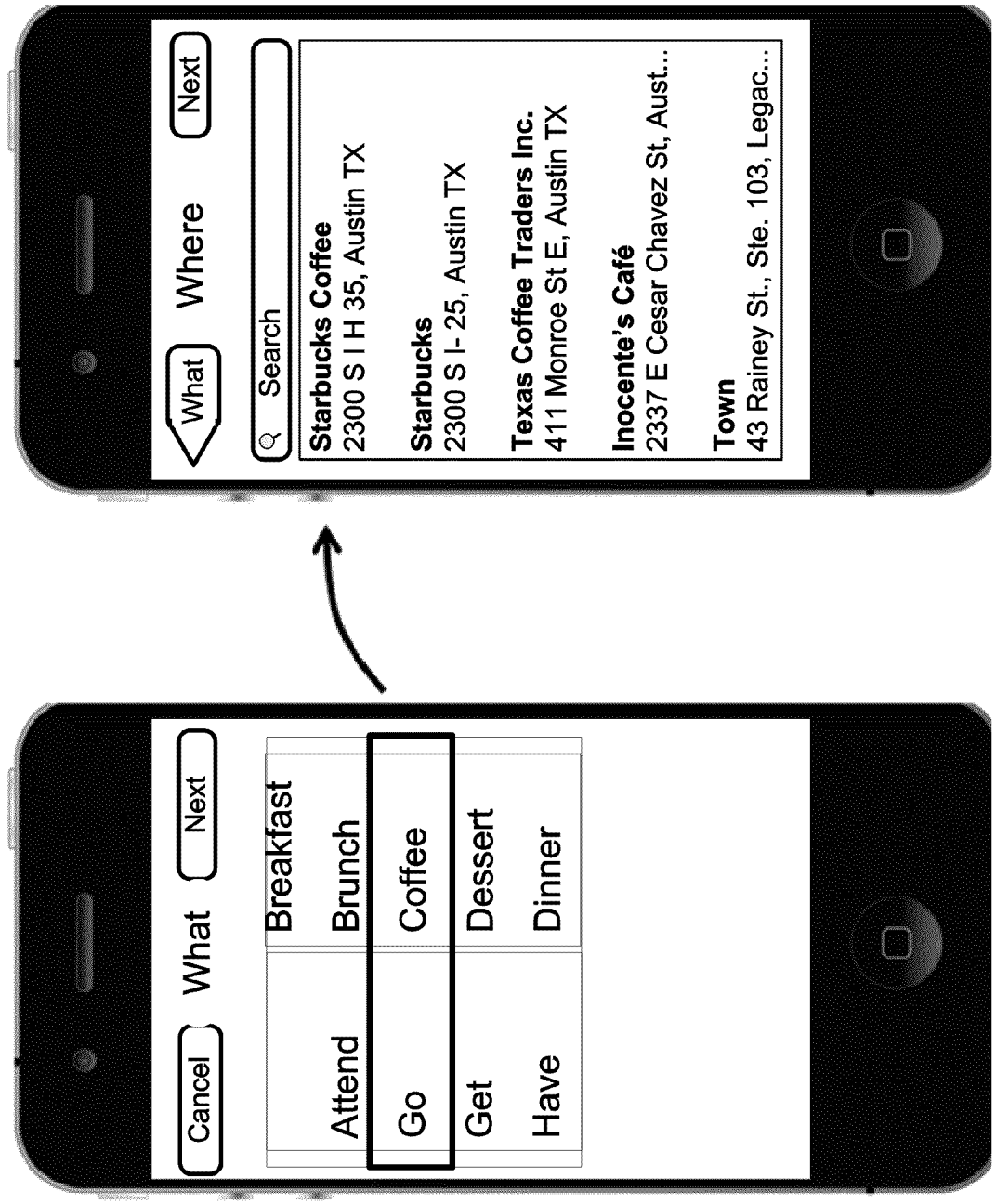

FIGS. 23, 24 and 25 illustrate a method for posting users to create postings, such as event postings, using a mobile interface. In FIG. 23, a posting user may select a type of activity by interacting with one or more scrolling wheels from a mobile device screen, such as an iPhone, for example. As shown in FIG. 23, there may be two scrolling wheels from which a posting user may select a type of activity. One wheel, in FIG. 23, the left wheel 2300 may include choices of primary categories. One example of primary categories may be a set of verbs, for example, "Go", "Get", "Watch", etc. Another wheel, in FIG. 23, the right wheel 2301 may be dynamically loaded based on the primary category selection. For example, if the left wheel 2300 selection is "Go", the right wheel 2301 selection may be "Surfing", "Bowling", "Sailing", etc. As another example, if the left wheel 2300 selection is "Get", the right wheel 2301 selection may include choices for "Breakfast", "Brunch", "Drinks", etc. As another example, if the left wheel 2300 selection is "Watch", the right wheel 2301 selection may include choices for "Movie", "Show", etc.

The wheel selection may also be organized into primary categories and subcategories. For example, the left wheel may include various primary categories for activities (such as Sports, Entertainment, Recreation, Lifestyle) as discussed above, and the right wheel selection may be dynamically loaded with options based on subcategories within the primary categories. For example, upon selecting "Sports" in the left wheel 2300, various sports options such as "Basketball", "Tennis", "Soccer", and "Football" may be loaded in the right wheel 2301, and made available for the user to select from.

As shown in FIG. 24, the system may automatically generate an activity description from the posting user's wheel selections. For example, if the user selects "Go" and "Surfing", the system may automatically generate a description 2401 of "Going Surfing." Similarly, the system may automatically generate a description 2401 of "Attending Lecture" from wheel selections of "Attend" and "lecture", or "Getting Dinner" from wheel selections of "Get" and "Dinner", or "Seeing a band" from wheel selections of "See" and "Band." It can be appreciated that various types of activity descriptions 2401 may be automatically generated from the various wheel selection combinations that are possible. In addition, the user may also be able to input other fields for the event posting such as a more detailed description 2402, location 2403, an event time 2404, and may invite other viewing users to participate in the event in 2405.

Based on the wheel selections and other information that is provided by the posting user, the system may automatically associate certain keyword tags from the central keyword database for the event posting. The system may be able to analyze various English words and phrases added to the posting description by posting user, whereby the wheel selection acts as a filter to improve this analysis, allowing for the mapping to focus on a more narrow range of possible choices to correctly generate certain keyword tags. In doing so, the system may need to take into account tense, plurality, misspelling, and other factors. Because the event posting may be associated with various posting keyword tags, the event posting may be displayed for various viewing users in a smart-feed, as a result of a search, in the user's smart-calendar or through other means as discussed above.

In FIG. 25, the system may automatically generate location selections from the posting user's wheel selections. For example, if the user selects "Get" and "Coffee", the system may automatically generate several choices of nearby coffee shops for the posting user to choose from. In addition, the user may also be able to use a search function to search for other locations within a database. Alternatively, the user may be able to input a location name and address if the location is not available in the search results or automated options offered. The system may choose to present the automatically generated choices in a certain order, for example, by highlighting sponsored results on top or in some other manner.

Figure 26:
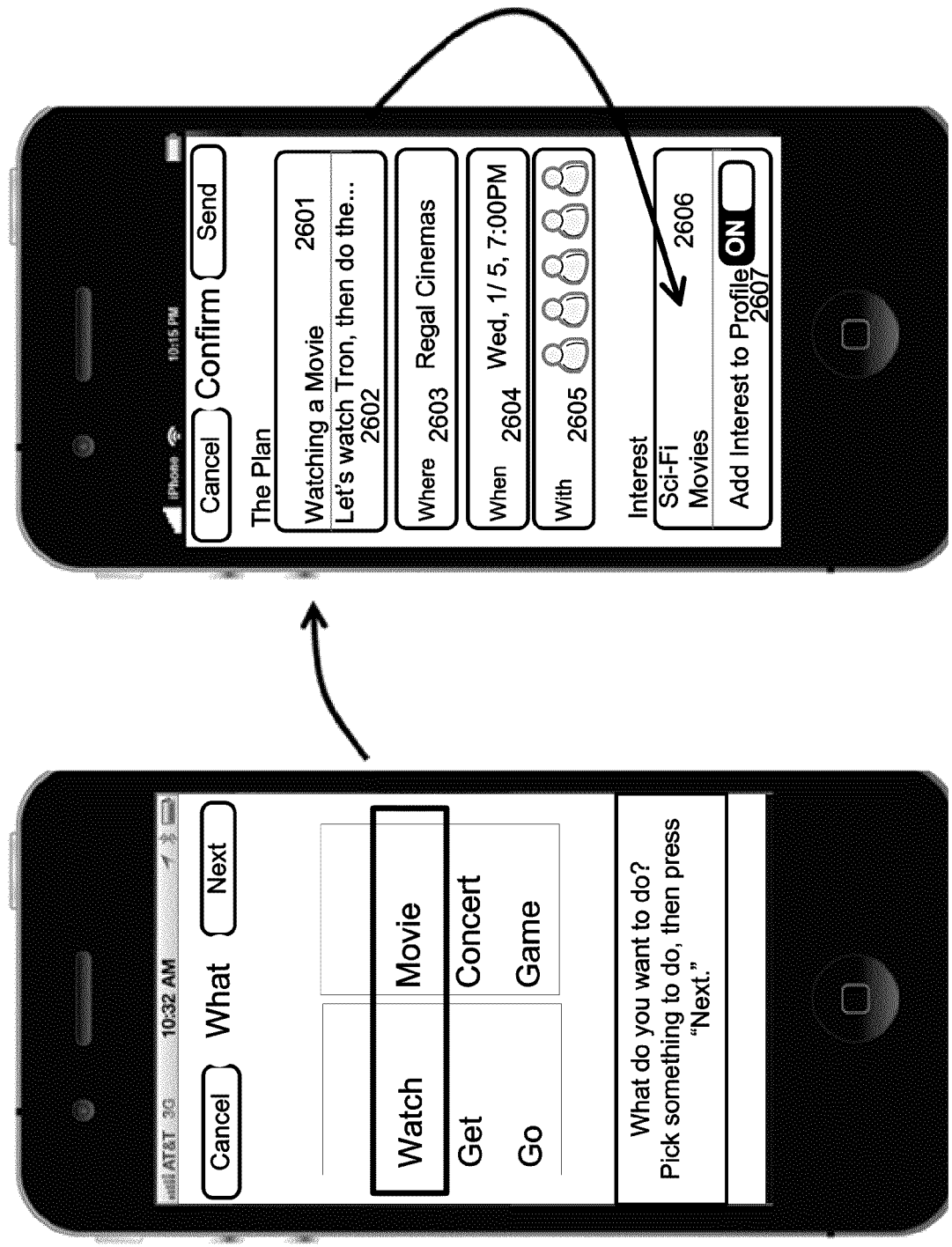

As shown in FIG. 26, if the user inputs an additional description into the input field 2602, the system may automatically suggest one or more interests (or profile keyword tags) 2606 to be mapped to the user's profile. The user may be given an option with buttons 2607 to be able to add the interest (or profile keyword tag) to the user's profile. Further, the system may leverage the user's wheel selections to improve the interest (or profile keyword tag) suggestions. For example, if the user selects "Watch" and "Movie" using the wheel selections and enters a description into input field 2602, the system may then analyze description content for movie-related interests (thus reducing false-positive matches that could produce interests not related to movies). The user may also input a location into field 2603, a time into field 2604, and invite other users in field 2605.

Figure 27:

As shown in FIG. 27, in creating a posting, the posting user may also create an opportunity for automatic interest matching or other forms of advertisements. As described above, a posting user's wheel selections may allow the system to generate a posting description 2701, such as "Seeing a band" for example. Based on the user's wheel selections (and/or based on the user's other input fields such as the description 2702, location 2703, time 2704, invited friends 2705, etc.), the system may also identify or suggest other events, destinations, interests, etc. For example, the system may be able to semantically identify "Reggae Music" as an interest and allow the posting user an option to add it to the posting user's profile keyword tags. If other invited users 2705 make plans to attend the event as well, the system may also give those users the option to add the interest "Reggae Music" to such viewing user's profile keyword tags, as appropriate. It may also be possible to generate other advertisements based on the user's wheel selections (and/or based on the other input fields).

It can be appreciated that various types of postings may be created using the mobile interface (using wheel selection for the hierarchy of category selections) as described above. For example, in addition to event postings, the user may create other postings such as message postings, job postings, request postings, question postings, statement postings, news postings, etc. in various categories as selected by the wheel selections. There may also be varying numbers of wheels representing different category levels. For example, there may be only one wheel, or three wheels, four wheels, five wheels, etc.

All concepts of the invention may be incorporated or integrated with other systems and methods for utilizing social network information, including but not limited to those described in U.S. Patent Publication No. 2007/0174304 (Shrufi et al.) published on Jul. 26, 2007 and U.S. Patent Publication No. 2008/0040673 (Zuckerberg et al.) published on Feb. 14, 2008, which are hereby incorporated by reference in their entirety.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of displaying social network information customized to interests of a user comprising:
creating a central keyword database having one or more pre-defined keyword descriptors;
tagging a user profile of the user with one or more keyword descriptors for associating the user with the keyword descriptors;
tagging a posting within a social network with one or more keyword descriptors from the central keyword database for associating the posting with the keyword descriptors;
using one or more processors, applying a plurality of matching criteria to the user profile and the posting; and
displaying the posting to an event calendar of the user if (i) matched by the plurality of matching criteria to the user profile and (ii) the posting has been created by a posting user having a social connection with the user and designated by the posting user as being accessible by the user, wherein the matching criteria provides the user with postings customized to interests of the user;
wherein the plurality of matching criteria further comprises a comparison of keyword descriptors tagged to the user profile and keyword descriptors tagged to the posting and wherein the keyword descriptors are organized into categories and the plurality of matching criteria comprises an evaluation of the categories of the keyword descriptors tagged to the user profile and keyword descriptors tagged to the posting.

2. The method of claim 1, wherein the social connection is a first degree relationship.

3. The method of claim 1, wherein the posting is an event posting and comprises a title, an event time, and a location, and the event posting is displayed to the event calendar if the location is within a pre-defined distance of a current location of the user.

4. The method of claim 1, wherein the posting is generated from a third party website.

5. The method of claim 1, wherein the plurality of matching criteria is based on profile keyword descriptors of the user.

6. The method of claim 1, wherein the plurality of matching criteria is based on the user profile.

7. The method of claim 1, wherein the posting is posted by a posting user, and wherein the plurality of matching criteria is based on a relationship between the user and the posting user.

8. The method of claim 1, wherein the posting is posted by a posting user and is published to the posting user's other social networking sites.

9. The method of claim 1, wherein the plurality of matching criteria includes evaluating groupings of keyword descriptors.

10. The method of claim 1, further comprising displaying advertisements relating to keyword descriptors.

11. The method of claim 1, wherein the posting is an event posting, and further comprising receiving a request from the user to join the event posting displayed to the user.

12. A method of searching social network information customized to interests of a user comprising:

creating a central keyword database having one or more pre-defined keyword descriptors;

receiving a search request having search criteria for postings from the user, wherein a user profile of the user is tagged with one or more keyword descriptors;

using one or more processors, applying a plurality of matching criteria to the user profile and a plurality of postings, wherein the plurality of postings are each tagged with one or more keyword descriptors; and displaying a result set of postings which satisfy the search criteria and are matched by the plurality of matching criteria, wherein the result set of postings is customized to interests of the user and wherein the result set of postings is displayed if the postings have been created by a posting user having a first degree social connection with the user;

wherein the plurality of matching criteria further comprises a comparison of keyword descriptors tagged to the user profile and keyword descriptors tagged to the posting and wherein the keyword descriptors are organized into categories and the plurality of matching criteria comprises an evaluation of the categories of the keyword descriptors tagged to the user profile and keyword descriptors tagged to the posting.

13. The method of claim 12, wherein the plurality of matching criteria further comprises a comparison of keyword descriptors tagged to the user profile and keyword descriptors tagged to the posting.

14. The method of claim 12, wherein the plurality of matching criteria is based on keywords tagged to the user profile.

15. The method of claim 12, wherein the plurality of matching criteria is based on the user profile.

16. A method of displaying social network information to a news feed customized to interests of a user comprising:

creating a central keyword database having one or more pre-defined keyword descriptors;

tagging a user profile of the user with one or more keyword descriptors for associating the user with the keyword descriptors;

tagging a posting within a social network with one or more keyword descriptors from the central keyword database for associating the posting with the keyword descriptors;

using one or more processors, applying a plurality of matching criteria to the user profile and the posting; and displaying the posting to the news feed of the user if matched by the plurality of matching criteria to the user profile and the postings have a social connection with the user, wherein the matching criteria provides the user with postings customized to interests of the user;

wherein the plurality of matching criteria further comprises a comparison of keyword descriptors tagged to the user profile and keyword descriptors tagged to the posting and wherein the posting is an event posting, and further comprising displaying a number of users having a social connection with the user who have joined the event posting.

* * * * *